(12) United States Patent
Shaked et al.

(10) Patent No.: US 11,768,068 B2
(45) Date of Patent: Sep. 26, 2023

(54) SYSTEM FOR SPATIAL MULTIPLEXING

(71) Applicant: Ramot at Tel-Aviv University Ltd., Tel Aviv (IL)

(72) Inventors: Natan Tzvi Shaked, Tel Aviv (IL); Simcha Mirsky, Tel Aviv (IL)

(73) Assignee: Ramot at Tel-Aviv University LTD., Tel Aviv (IL)

( * ) Notice: Subject to any disclaimer, the term of this patent is extended or adjusted under 35 U.S.C. 154(b) by 0 days.

(21) Appl. No.: 17/614,804

(22) PCT Filed: May 24, 2020

(86) PCT No.: PCT/IL2020/050568
§ 371 (c)(1),
(2) Date: Nov. 29, 2021

(87) PCT Pub. No.: WO2020/240541
PCT Pub. Date: Dec. 3, 2020

(65) Prior Publication Data
US 2022/0307815 A1   Sep. 29, 2022

Related U.S. Application Data

(60) Provisional application No. 62/853,883, filed on May 29, 2019.

(51) Int. Cl.
*G01B 9/02015* (2022.01)
*G01B 9/02* (2022.01)
(Continued)

(52) U.S. Cl.
CPC ..... *G01B 9/02027* (2013.01); *G01B 9/02032* (2013.01); *G01B 9/02047* (2013.01);
(Continued)

(58) Field of Classification Search
CPC ............ G01B 9/02027; G01B 9/02032; G01B 9/02047; G01B 9/04; G03H 1/0443;
(Continued)

(56) References Cited

U.S. PATENT DOCUMENTS 6,775,435 B1   8/2004   Liu
8,559,014 B2 *  10/2013   Jeong ................... A61B 6/5282
                                         356/491

(Continued)

FOREIGN PATENT DOCUMENTS

WO   WO2019/008569 A1   1/2019

OTHER PUBLICATIONS

Li, Yanlu et al. "Six-beam homodyne laser Doppler vibrometry based on silicon photonics technology". Optics Express, vol. 26, No. 3, Feb. 5, 2018, pp. 3638-3645. (Year: 2018).*

(Continued)

*Primary Examiner* — Michael A Lyons
(74) *Attorney, Agent, or Firm* — Whitestone Law, PLLC

(57) ABSTRACT

Some embodiments are directed to a technique having an off-axis interferometric geometry that is capable of spatially multiplexing at least six complex wavefronts, while using the same number of camera pixels typically needed for a single off-axis hologram encoding a single complex wavefront. Each of the at least six parallel complex wavefronts is encoded into an off-axis hologram with a different fringe orientation, and all complex wavefronts can be fully reconstructed. This technique is especially useful for highly dynamic samples, as it allows the acquisition of at least six complex wavefronts simultaneously, optimizing the amount of information that can be acquired in a single camera exposure. The off-axis multiplexing holographic system of some embodiments provide an off-axis holography modality that is more camera spatial bandwidth efficient than on-axis
(Continued)

holography. Moreover, the off-axis interferometric system allows simple simultaneous acquisition of at least six holographic channels, making it attractive for imaging dynamics.

15 Claims, 12 Drawing Sheets
(8 of 12 Drawing Sheet(s) Filed in Color)

(51) Int. Cl.
*G03H 1/26* (2006.01)
*G01B 9/04* (2006.01)
*G03H 1/04* (2006.01)
*G03H 1/00* (2006.01)

(52) U.S. Cl.
CPC ............ *G01B 9/04* (2013.01); *G03H 1/0443* (2013.01); *G03H 1/265* (2013.01); *G03H 2001/005* (2013.01); *G03H 2001/0445* (2013.01); *G03H 2001/0452* (2013.01); *G03H 2001/0456* (2013.01); *G03H 2001/0458* (2013.01); *G03H 2001/0473* (2013.01); *G03H 2001/266* (2013.01); *G03H 2223/13* (2013.01)

(58) Field of Classification Search
CPC ........... G03H 1/265; G03H 2001/0445; G03H 2001/0452; G03H 2001/0456; G03H 2001/0458; G03H 2001/0473
See application file for complete search history.

(56) References Cited

U.S. PATENT DOCUMENTS

| 2008/0218836 | A1 | 9/2008 | Suzuki et al. | |
|---|---|---|---|---|
| 2014/0125989 | A1* | 5/2014 | Chen | G01B 9/02 356/491 |
| 2015/0292858 | A1* | 10/2015 | Atlan | G03H 1/0866 356/457 |
| 2017/0199495 | A1* | 7/2017 | Matsubara | G03H 1/265 |
| 2019/0162520 | A1* | 5/2019 | Shaked | G01B 11/2441 |

OTHER PUBLICATIONS

Rubin, M., et al., "Six-pack off-axis holography," Optics Lett. 2017;42(22):4611-4614.
Dardikman, G., et al., "Optimal spatial bandwidth capacity in multplexed off-axis holography for rapid quantitative phase reconstruction and visualization," Optics Express 2017;25(26):33400-33415.
Girshovitz, P., et al., "Broadband quantitative phase microscopy with extended field of view using off-axis interferometric multiplexing," J. Biomed. Opt. 2015;20(11):pp. 111217:1-6.
Turko, N., et al., "Simultaneous three-wavelength unwrapping using external digital holographic multiplexing module," Opt. Lett. 2018;43(9):1943-1946.
Nygate, Y., et al., "Simultaneous off-axis multiplexed holography and regular fluorescence microscopy of biological cells," Opt. Lett. 2018;43(1):2587-2590.
Wolbromsky, L., et al., "Single-exposure full-field multi-depth imaging using low-coherence holographic multiplexing," Opt. Lett. 2018;43(9):2046-2049.
Charriere, F., et al., "Shot-noise influence on the reconstructed phase image signal-to-noise ratio in digital holographic microscopy," Appl. Opt. 2006;45(29):7667-7673.
Shaked, N. T., "Quantitative phase microscopy of dynamic cells using off-axis holographic compression by spatial multiplexing," Unconventional Optical Imaging, vol. 10677, International Society for Optics and Photonics, 2018.
International Search Report for PCT Patent App. No. PCT/IL2020/050568 (dated Sep. 7, 2020).

* cited by examiner

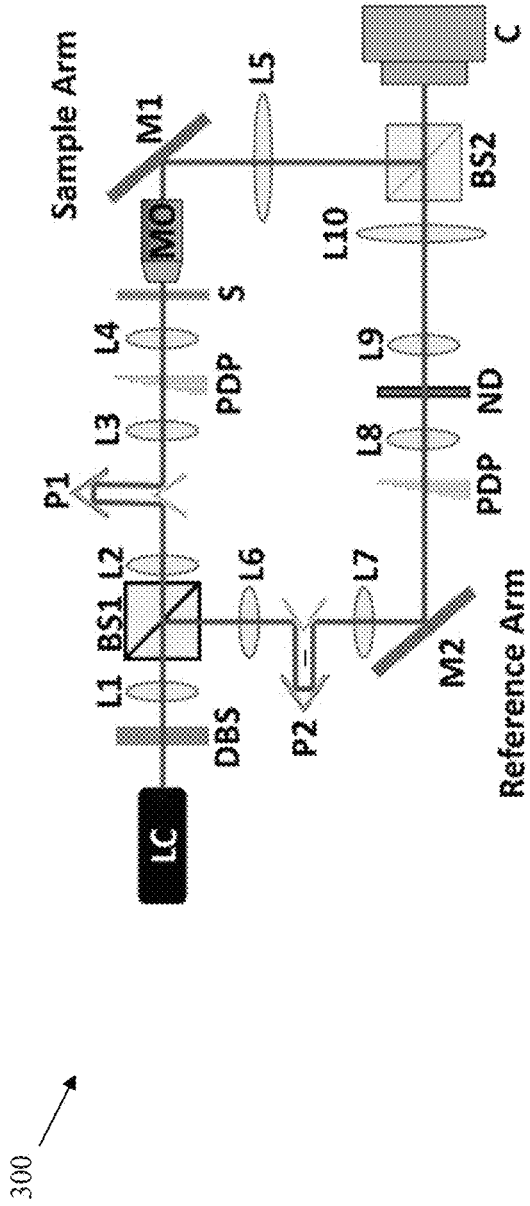

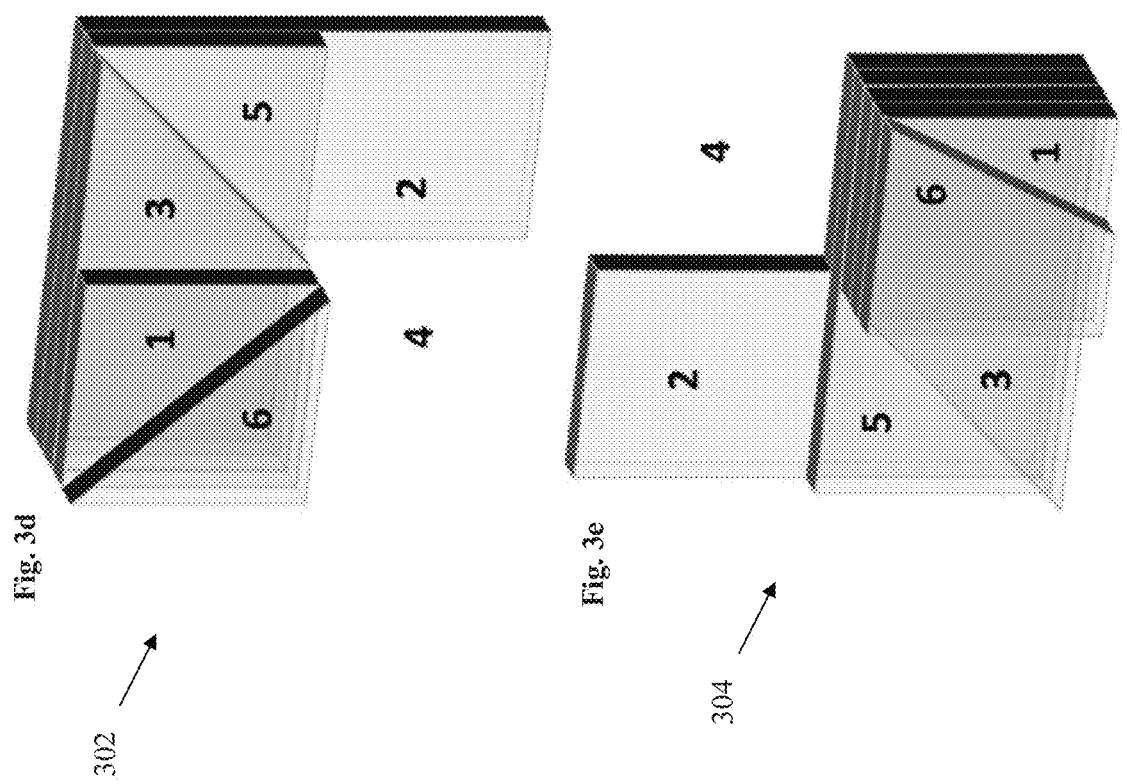

1PH

2PH

4PH

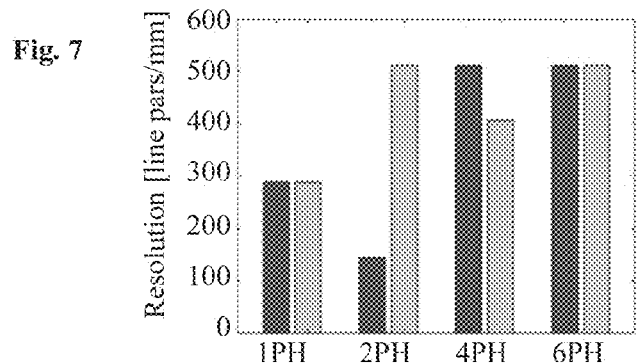
Fig. 7
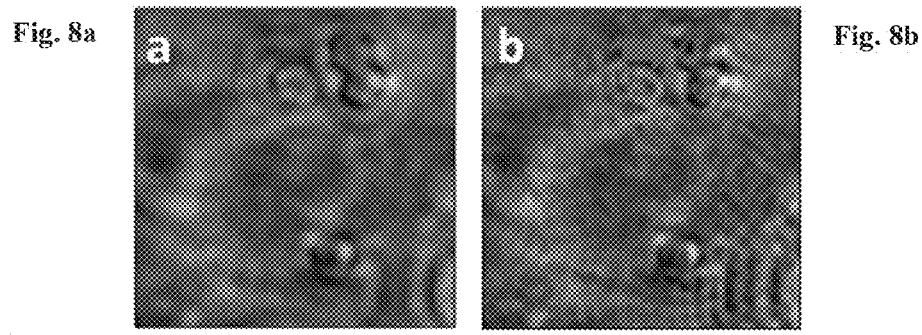
Fig. 8a  Fig. 8b
Fig. 8c  Fig. 8d
Fig. 8e  Fig. 8f
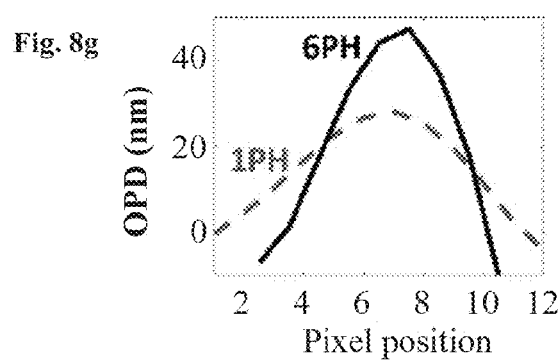
Fig. 8g

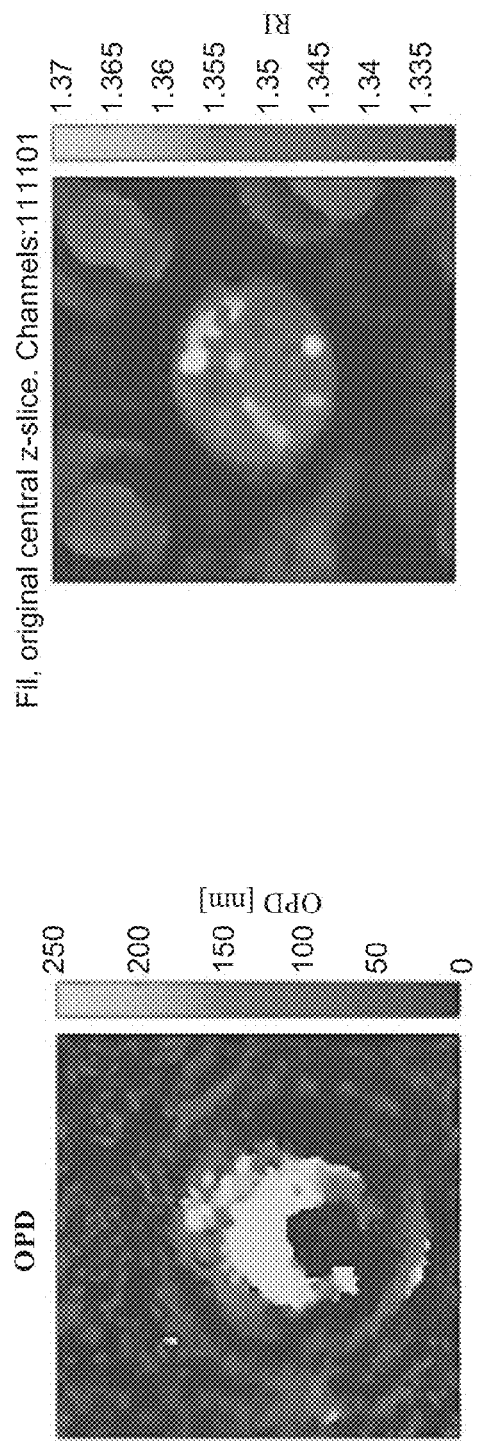
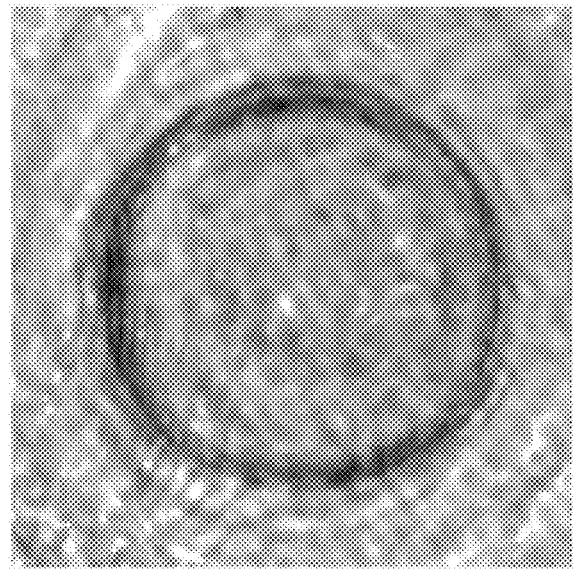
Fig. 10b
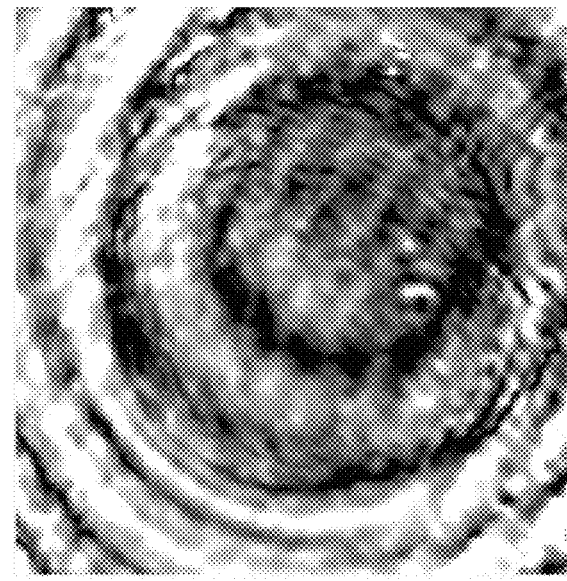
Fig. 10d
Fig. 10a
Fig. 10c

SYSTEM FOR SPATIAL MULTIPLEXING

CROSS REFERENCE TO RELATED APPLICATION(S)

This application is a national phase filing under 35 C.F.R. § 371 of and claims priority to PCT Patent Application No. PCT/IL2020/050568, filed on May 24, 2020, which claims the priority benefit under 35 U.S.C. § 119 of U.S. Provisional Application No. 62/853,883 filed on May 29, 2019, the contents of each of which are hereby incorporated by reference in their entireties.

GOVERNMENT SPONSORED RESEARCH

The project leading to this application received funding from the European Research Council (ERC) under the European Union's Horizon 2020 Research and Innovation Program (grant agreement No 678316).

BACKGROUND

Some embodiments of the presently disclosed subject matter relate to interferometry, and more specifically, to holographic interferometric systems for measuring biological samples or other samples.

Related art references considered to be relevant as background to some embodiments of the presently disclosed subject matter are listed below:

[1] M. Rubin, G. Dardikman, S. Mirsky, N. Turko and N. Shaked, "Six-pack off-axis holography," *Optics Letters*, vol. 42, no. 22, pp. 4611-4614, 2017.
[2] G. Dardikman, N. A. Turko, N. Nativ, S. K. Mirsky and N. T. Shaked, "Optimal spatial bandwidth capacity in multiplexed off-axis holography for rapid quantitative phase reconstruction and visualization," *Optics Express*, vol. 25, no. 26, pp. 33400-33415, 2017.
[3] P. Girshovitz, I. Frenklach and N. Shaked, "Broadband quantitative phase microscopy with extended field of view using off-axis interferometric multiplexing," *J. Biomed. Opt.*, vol. 20, no. 11, pp. 111217: 1-6, 2015.
[4] N. Turko, P. Eravuchira, I. Barnea and N. Shaked, "Simultaneous three-wavelength unwrapping using external digital holographic multiplexing module," *Opt. Lett.*, vol. 43, no. 9, pp. 1943-1946, 2018.
[5] Y. Nygate, N. Singh, N. Turko and N. Shaked, "Simultaneous off-axis multiplexed holography and regular fluorescence microscopy of biological cells," *Opt. Lett.*, vol. 43, no. 1, pp. 2587-2590, 2018.
[6] L. Wolbromsky, N. Turko and N. Shaked, "Single-exposure full-field multi-depth imaging using low-coherence holographic multiplexing," *Opt. Lett.*, vol. 43, no. 9, pp. 2046-2049, 2018.
[7] F. Charrière, T. Colomb, F. Montfort, E. Cuche, P. Marquet and D. C, "Shot-noise influence on the reconstructed phase image signal-to-noise ratio in digital holographic microscopy," *Appl. Opt.*, vol. 45, no. 29, pp. 7667-7673, 2006.

Acknowledgement of the above references herein is not to be inferred as meaning that these are in any way relevant to the patentability of some embodiments of the presently disclosed subject matter.

BACKGROUND

Holography can record the entire complex wavefront (amplitude and phase) of light interacting with the sample, by recording interference between a beam that has interacted with the sample and a reference beam that does not contain the sample spatial modulation. There are two main approaches to holographic wavefront acquisition: on-axis and off-axis holography. In on-axis holography, the two beams interfere with no angle between them, which causes mixing of the sample and reference intensities with the complex wavefront of the sample. For a non-sparse sample, this approach requires the acquisition of three or four phase-shifted holograms of the same sample instance in order to isolate the sample's complex wavefront from the undesired complex wave data. If these holograms are acquired sequentially, i.e. at different times, fast dynamic processes cannot be recorded. However, in order to acquire the holograms simultaneously, three or four camera planes are needed, requiring extended sensor sizes with slower frame rates and resulting in registration problems between the different camera planes. Off-axis holography, on the other hand, allows capturing the complex wavefront of the sample within a single camera exposure. This single-exposure complex wavefront acquisition is accomplished in off-axis holography by inducing a small angle between the sample and reference beams creating the interference pattern of the hologram and is highly relevant for quantitatively imaging dynamic samples.

GENERAL DESCRIPTION

This single-exposure mode is possible, since, in the spatial frequency domain, there is a full separation between the auto-correlation term, originating from the sample and reference beam intensities, and the cross-correlation (CC) terms, each of which contains the complex wavefront of the sample. The spatial frequency separation in off-axis holography typically occurs across a single axis, allowing the compression of more information along other axes as well, thereby taking advantage of the unused space in the spatial frequency domain. This can be achieved experimentally by multiplexing several holograms with different interference fringe orientations into a single multiplexed hologram, followed by full reconstruction of the complex wavefronts encoded. Each of these holograms can contain additional data on the imaged sample, meaning that multiplexing enables the acquisition of more information while using the same number of camera pixels. This is beneficial for highly dynamic samples as more dynamic data can be recorded simultaneously.

Various holographic techniques can benefit from the multiplexed parallel data channels, such as extended field of view of imaging [3], multicolor imaging [4], measuring the Jones matrix (and the birefringence), or measuring fluorescence and quantitative phase profiles together [5], tomographic phase microscopy with less angular scanning for 3D refractive index imaging, multi-depth imaging [6], and holographic imaging of ultrafast events using laser pulses.

There is a need in the art to optically multiplex a large number of interferometric channels in a single camera exposure without experiencing cross-talk between the beams and while efficiently utilizing the detector's spatial bandwidth. Some embodiments of the presently disclosed subject matter provide a novel technique for optically multiplexing at least six interferometric channels in a single camera exposure. Previously, the largest number of interferometric channels that could be efficiently optically multiplexed, was four. This was largely due to the fact that when multiplexing a large number of channels, there is an increasingly problematic issue of cross-talk between the sample and reference beams.

The ability to optically multiplex at least six interferometric channels, as opposed to the previous maximum of four, enables a 50% increase in the amount of complex wavefront data that can be acquired in a single camera exposure, making this technique invaluable for acquiring complex wavefront data on dynamic samples, fast processing, or simply decreasing the time required to scan a large object composed of multiple fields of view.

Some embodiments of the presently disclosed subject matter provide a technique having an off-axis interferometric geometry that is capable of spatially multiplexing at least six complex wavefronts, while using the same number of camera pixels typically needed for a single off-axis hologram encoding a single complex wavefront. Each of the at least six parallel complex wavefronts is encoded into an off-axis hologram with a different fringe orientation, and all or most complex wavefronts can be fully reconstructed. This technique is especially useful for highly dynamic samples, as it allows the acquisition of at least six complex wavefronts simultaneously, optimizing the amount of information that can be acquired in a single camera exposure. The novel off-axis multiplexing holographic system of some embodiments of the presently disclosed subject matter provide an off-axis holography modality that is more camera spatial bandwidth efficient than on-axis holography. Moreover, the off-axis interferometric system allows simple simultaneous acquisition of at least six holographic channels, making it attractive for imaging dynamics.

The off-axis interferometric system allows the compression of at least six complex wavefronts into a single multiplexed off-axis hologram without loss of magnification or resolution, where the multiplexed hologram contains straight off-axis fringes of at least six different orientations.

The novel optical off-axis interferometric system provides spatial multiplexing of at least six interferometric channels, in which at least six imaging channels are simultaneously acquired. Being able to perform highly rapid acquisition and processing of complex wavefronts in a quantitative, non-destructive, and nonintrusive manner, opens new horizons for biomedical and metrological applications, with focus on the acquisition of quantitative complex wavefronts of highly dynamic processes of transparent and semi-transparent samples, such as flowing biological cells in vitro and lithography/etching processes.

In some embodiments, the novel off-axis interferometric system of the presently disclosed subject matter is capable of generating dynamic six-pack holography. In this connection, it should be understood that to implement a six-pack holography system, first, six interference channels are required, which may make the optical system very complex and not feasible for realization. Second, in addition to the desired channels, non-matching sample or reference beams also induce interference terms that typically overlap with useful interference terms in the spatial-frequency domain. Third, the camera's grayscale dynamic range is shared by the multiplexed holographic channels. The multiplexed holograms produced by the off-axis interferometric system are included of at least six off-axis holograms, each produced by illuminating the sample from a different angle, yet still utilizing the same number of camera pixels.

Therefore, according to some embodiments of the presently disclosed subject matter, there is provided an off-axis interferometric system including a first beam splitter being configured and operable for receiving at least six beams, defining the common optical path, and dividing a common optical path into a sample arm and reference arm; first and second phase delay plates are placed in the optical path of the sample and reference arms respectively, wherein the first phase delay plate is placed upstream (i.e. before) of a sample, and the second phase delay plate is configured and operable to receive at least six beams of the reference arm; the first and second phase delay plates are configured and operable to induce (1) a phase delay between each of the at least six beams to encode each of the at least six beams with a different fringe orientation and preventing the at least six beams from interfering with each other, thereby creating at least six parallel interference channels having different interference orientations on a detector; and (2) a different phase delay between the at least six beams of the reference and sample arms; and a second beam splitter/combiner placed downstream of the second phase delay plate which is configured and operable for receiving at least six delayed reference beams and at least six delayed sample beams being indicative of the sample and combining them accordingly, such that the off-axis interferometric system is configured and operable to compress at least six parallel complex wavefronts into a single multiplexed off-axis hologram containing linear off-axis fringes of at least six different orientations.

As shown, the novel off-axis interferometric system has the significant capability of being more spatial bandwidth efficient than any other off-axis holographic configuration, and even on-axis holography. This constitutes a change in the fundamental paradigm of holographic imaging. Furthermore, since the at least six channels are acquired at once (i.e. simultaneously), the novel off-axis interferometric system does not suffer from pixel registration problems, making it suitable for acquiring complex wavefronts of highly dynamic samples.

In some embodiments, the off-axis interferometric system further includes a beam divider configured and operable for receiving an at least partially coherent light beam and generating the at least six beams along the common optical path, wherein the first beam splitter is placed downstream of the beam divider.

In some embodiments, the beam divider is configured for generating a plurality of beams in a diverging pattern.

In some embodiments, the off-axis interferometric system further includes first and second periscopes placed in the optical path of the sample and reference arms respectively and is configured and operable to match the optical paths of the plurality of beams between the sample and reference arm.

In some embodiments, the off-axis interferometric system further includes an arrangement of lenses configured and operable for at least one of imaging beams passing therethrough, collimating the beams propagating therethrough, or magnifying the size of the diverging pattern.

In some embodiments, each of the first and second phase delay plates includes an arrangement defining a plurality of sections configured such that each of the at least six beams passes through a different section, wherein each section has a different optical path length.

In some embodiments, the off-axis interferometric system further includes a light module generating the at least partially coherent light beam. The light module may include at least one light source and optionally other elements such as beam divider, or filters may be integrated within the light module, as will be described further below.

In some embodiments, the off-axis interferometric system further includes a detector placed downstream the second beam splitter/combiner and is configured and operable to collect and image the at least six combined complex wavefronts simultaneously in a single exposure.

In some embodiments, the off-axis interferometric system further includes a processing unit being connected to the detector. The processing unit is configured and operable to receive data indicative of the at least six combined complex wavefronts and to process the data to reconstruct each of the at least six parallel complex wavefronts encoded.

In some embodiments, the off-axis interferometric system further includes an optical element (e.g. converging lens or an arrangement of mirrors) being configured and operable to illuminate the sample at least six different illumination angles other than normal incidence, such that each of the at least six optically compressed off-axis holograms encodes a different spatial frequency range of the imaged sample. For example, placing a 4f system of lenses after the beam divider may cause the six beams from the beam divider to focus on the sample. Different 4f systems can be used (e.g. two 4f systems of lenses before the sample).

In some embodiments, the off-axis interferometric system is configured for synthetic aperture (SA) super-resolution imaging and is used to increase resolution through dynamic synthetic aperture super-resolution imaging, where each of the six optically compressed off-axis holograms encodes a different spatial frequency range of the imaged sample, yielding 1.62× resolution enhancement. The processing unit is thus configured and operable to generate a super-resolved image, creating an increased synthetic numerical aperture (NA). To this end, the processing unit may be configured and operable to perform a single digital 2D Fourier transform of the data, and to crop the at least six cross-correlation terms corresponding to the at least six complex wavefronts from the six illumination angles to construct a synthetic aperture.

However, the off-axis interferometric system of some embodiments of the presently disclosed subject matter is not limited to this configuration and may be configured for many other applications. Various types of data and techniques can benefit from adaptions of the off-axis interferometric system. These may include field of view multiplexing, wavelength multiplexing, phase and fluorescence multiplexing, z-plane multiplexing, tomographic phase microscopy with less angular scanning for 3D refractive index imaging (illumination angle multiplexing), holographic imaging of ultrafast events using laser pulses, and many others. When the off-axis interferometric system is configured for tomographic phase microscopy, the processing unit is then configured and operable to generate a 3D refractive index map of a sample.

In some embodiments, the off-axis interferometric system is configured and operable to acquire six or more complex wavefronts of different wavelengths.

In some embodiments, the processing unit is configured and operable to average at least six images produced from the at least six illumination angles, thereby increasing z-resolution and out-of-focus light rejection.

In some embodiments, the off-axis interferometric system is configured and operable to increase the field of view of the sample by a factor of at least six, by multiplexing the at least six fields of view.

In some embodiments, the off-axis interferometric system further includes at least six filters, wherein the first beam splitter is configured and operable for receiving at least one beam composed of at least six wavelengths; the at least six different wavelengths are configured for illuminating a sample, and the second beam splitter/combiner is configured and operable for receiving the at least six reference beams and the at least six sample beams scattered by the sample, and combining them accordingly, each filter being configured to allow propagation of one of the wavelengths for each of the at least six reference or sample beams. The beam divider is then configured and operable for generating at least six beams of different wavelengths along the common optical path (i.e. the beam divider creates the multiple beams (zero order, first order, etc.)). The light module is then configured for generating the at least partially coherent light beams of at least six different wavelengths. The light module may include a single light source used together with a beam divider (integrated within the same element or not) allowing propagation of a certain number of wavelengths. Alternatively, the light module may include a plurality of light sources used in parallel.

The processing unit is then configured and operable to perform a single digital 2D Fourier transform of the data, and to crop the at least six cross-correlation terms corresponding to the at least six complex wavefronts from the six wavelengths to construct a synthetic aperture. The processing unit may be configured and operable to average at least six images produced from the at least six wavelengths, thereby increasing z-resolution and out-of-focus light rejection. The six or more wavelengths may be used to generate synthetic wavelengths that increase the unambiguous range of a phase map.

According to some other embodiments of the presently disclosed subject matter, there is also provided a phase delay plate including an arrangement defining a plurality of adjacent sections having a certain shape and different optical path lengths. The different adjacent sections are disposed in a geometrical arrangement enabling each of at least six beams to pass through a different section. The arrangement may include multiple pieces of at least one material or is made of a single piece of material. The off-axis interferometric system of some embodiments of the presently disclosed subject matter may or may not be used with the novel phase delay plate.

It should be understood that to provide at least six interferometric channels, different techniques may be used: the sample may be illuminated using at least six coherence gated beams of the same wavelength, at least six different wavelengths as will be described below, different polarizations, or a combination of any of these and other techniques for eliminating crosstalk. The embodiments described above use coherence gating for a few beams of the same wavelength and may also use filters and multiple wavelengths for the other beams.

According to some other embodiments of the presently disclosed subject matter, there is also provided an off-axis interferometric system including: a first beam splitter being configured and operable for receiving at least one beam composed of at least six wavelengths and dividing a common optical path into a sample arm and reference arm; the at least six different wavelengths are configured for illuminating a sample; at least six filters, each filter being configured to allow propagation of one of the wavelengths for each of the at least six reference or sample beams; a second beam splitter/combiner being configured and operable for receiving the at least six reference beams and the at least six sample beams scattered by the sample, and combining them accordingly, such that the off-axis interferometric system is configured and operable to compress at least six parallel complex wavefronts into a single multiplexed off-axis hologram containing linear off-axis fringes of at least six different orientations. In some embodiments, the off-axis interferometric system further includes a beam divider configured and operable for receiving an at least partially coherent light beam and generating at least six beams of different wavelengths along the common optical path.

In some embodiments, the off-axis interferometric system further includes first and second periscopes placed in the optical path of the sample and reference arms respectively and is configured and operable to match the optical paths of the plurality of beams between the sample and reference arm.

In some embodiments, the off-axis interferometric system further includes an arrangement of lenses configured and operable for at least one of the imaging beams passing therethrough, collimating the beams propagating therethrough, or magnifying the size of the diverging pattern.

In some embodiments, the off-axis interferometric system further includes a light module generating the at least partially coherent light beams of at least six different wavelengths.

In some embodiments, the off-axis interferometric system further includes a detector placed downstream the second beam splitter/combiner. The detector is configured and operable to collect and image the at least six combined complex wavefronts simultaneously in a single exposure.

In some embodiments, the off-axis interferometric system further includes a processing unit being connected to the detector and being configured and operable to receive data indicative of the at least six combined complex wavefronts, and to process the data to reconstruct each of the at least six parallel complex wavefronts encoded. The processing unit may be configured as described above.

In some embodiments, the six or more wavelengths are used to generate synthetic wavelengths that increase the unambiguous range of a phase map.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 3a illustrates a possible configuration of the novel off-axis interferometric system according to some embodiments of the presently disclosed subject matter;

FIG. 3b illustrates typical beam paths in the sample arm for two sample beams at opposing angles from the optical axis for the off-axis interferometric system of FIG. 3a;

FIGS. 3d-3e illustrate two possible configurations of novel phase delay plates according to some embodiments of the presently disclosed subject matter;

FIG. 7 shows resolution limits in FIGS. 5a-5f and in FIGS. 6a-6c;

FIGS. 8a-8g illustrates red blood cells and microbeads amplitude and quantitative phase (OPD) maps;

FIGS. 10a-10d show out-of-focus light rejection results obtained by using the off-axis interferometric system of some embodiments of the presently disclosed subject matter.

DETAILED DESCRIPTION OF EMBODIMENTS

Figure 1A:
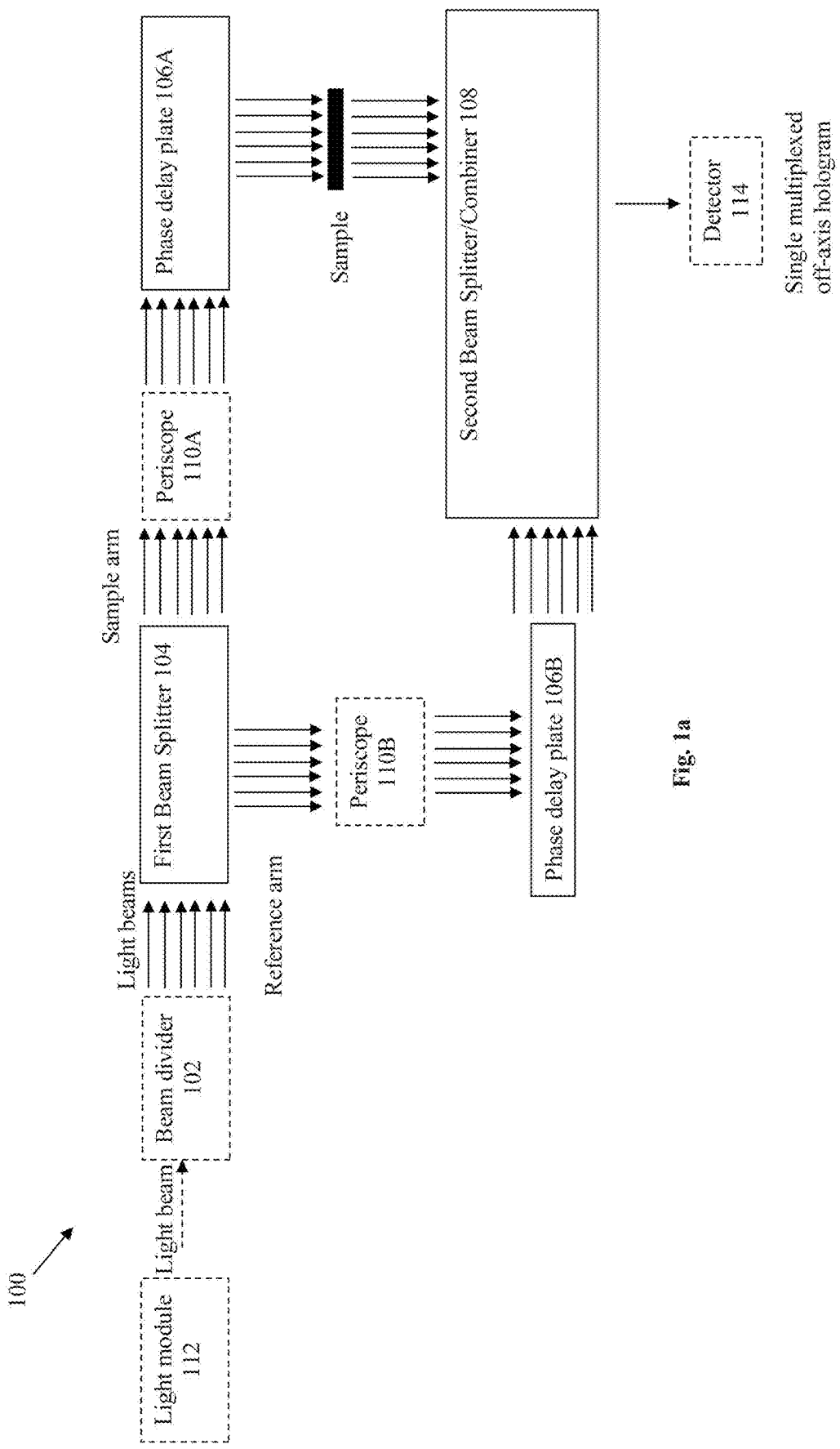
FIGS. 1a-1b are simplified block diagrams showing the main functional elements of the novel off-axis interferometric system of the presently disclosed subject matter according to some embodiments of the presently disclosed subject matter.

Reference is made to FIG. 1a illustrating by way of a block diagram the main functional elements of the off-axis interferometric system of some embodiments of the presently disclosed subject matter. The off-axis interferometric system 100 of some embodiments of the presently disclosed subject matter includes a first beam splitter 104 configured and operable for receiving the at least six beams and dividing the common optical path into a sample arm and reference arm; first and second phase delay plates 106A and 106B are placed in the optical path of the sample and reference arms respectively, the first and second phase delay plates 106A and 106B are configured and operable to induce a phase delay between the at least six beams to encode each of the at least six beams using a different fringe orientation, and prevent the at least six beams from interfering with each other, thereby creating at least six parallel interference channels having different interference orientations on a detector; wherein the first and the second phase delay plates 106A and 106B are configured for inducing a different phase delay between the at least six beams of the reference and sample arms; the first phase delay plate 106A is placed upstream of a sample being illuminated by at least six delayed sample beams respectively; and a second beam splitter/combiner 108 is placed downstream of the second phase delay plate 106B and is configured and operable for receiving the at least six reference beams and the at least six sample beams scattered by the sample, and combining them accordingly. The off-axis interferometric system 100 is thus configured and operable to compress at least six parallel complex wavefronts into a single multiplexed off-axis hologram containing linear off-axis fringes of at least six different orientations.

In some embodiments, the technique of the presently disclosed subject matter enables multiplexing a large number of channels, without cross-talk between the sample and reference beams efficiently, by using coherence gating. Coherence gating may be implemented using a custom-designed phase delay plates composed, for example, of a low-cost transparent material such as glass and grating (e.g. 2D), making it much less costly and more stable than alternatives (e.g. spatial light modifiers). To this end, off-axis interferometric system 100 may thus optionally include a beam divider (e.g. beam shaper) 102 configured and operable for receiving an at least partially coherent light beam and generating at least six beams of different wavelengths along a common optical path. First beam splitter 104 is placed downstream of beam divider 102. The beam divider 102 of some embodiments of the presently disclosed subject matter is not limited to any configuration and may be made of a diffraction grating of any dimension, a prism, a spatial light modulator (SLM) a diffractive beam splitter (also known as multispot beam generator, or array beam generator), or any element that may be configured and operable to receive an at least partially coherent light beam and generate at least six beams along a common optical path. Off-axis interferometric system 100 may optionally include a light module 112 generating the at least partially coherent light beam(s) of at least six different wavelengths. Beam divider 102 may be a part of the light module 112 or may be a separate element.

In some embodiments, off-axis interferometric system 100 further includes a detector 114 placed downstream second beam splitter/combiner 108. Detector 114 is configured and operable to collect and image at least six combined complex wavefronts simultaneously in a single exposure.

In some embodiments, off-axis interferometric system 100 further includes first and second periscopes 110A and 110B placed in the optical path of the sample and reference arms, respectively. First and second periscopes 110A and 110B are configured and operable to match the optical paths of the plurality of beams between the sample and reference arm. This enables adjustment of the optical path length of the reference arm in order to compensate for the delay induced by the sample. For example, periscope 110A may be static, while 110B can be adjusted to increase or decrease the path delay. However, the invention is not limited to this configuration, and 110A and 110B can be interchanged, or both can be non-static.

As will be described below with respect to FIGS. 3a-3b, off-axis interferometric system 100 may include an arrangement of lenses (shown in FIGS. 3a-3b) configured and operable for at least one of imaging beams passing therethrough, collimating the beams propagating therethrough, or magnifying the size of the diverging pattern.

Figure 1B:
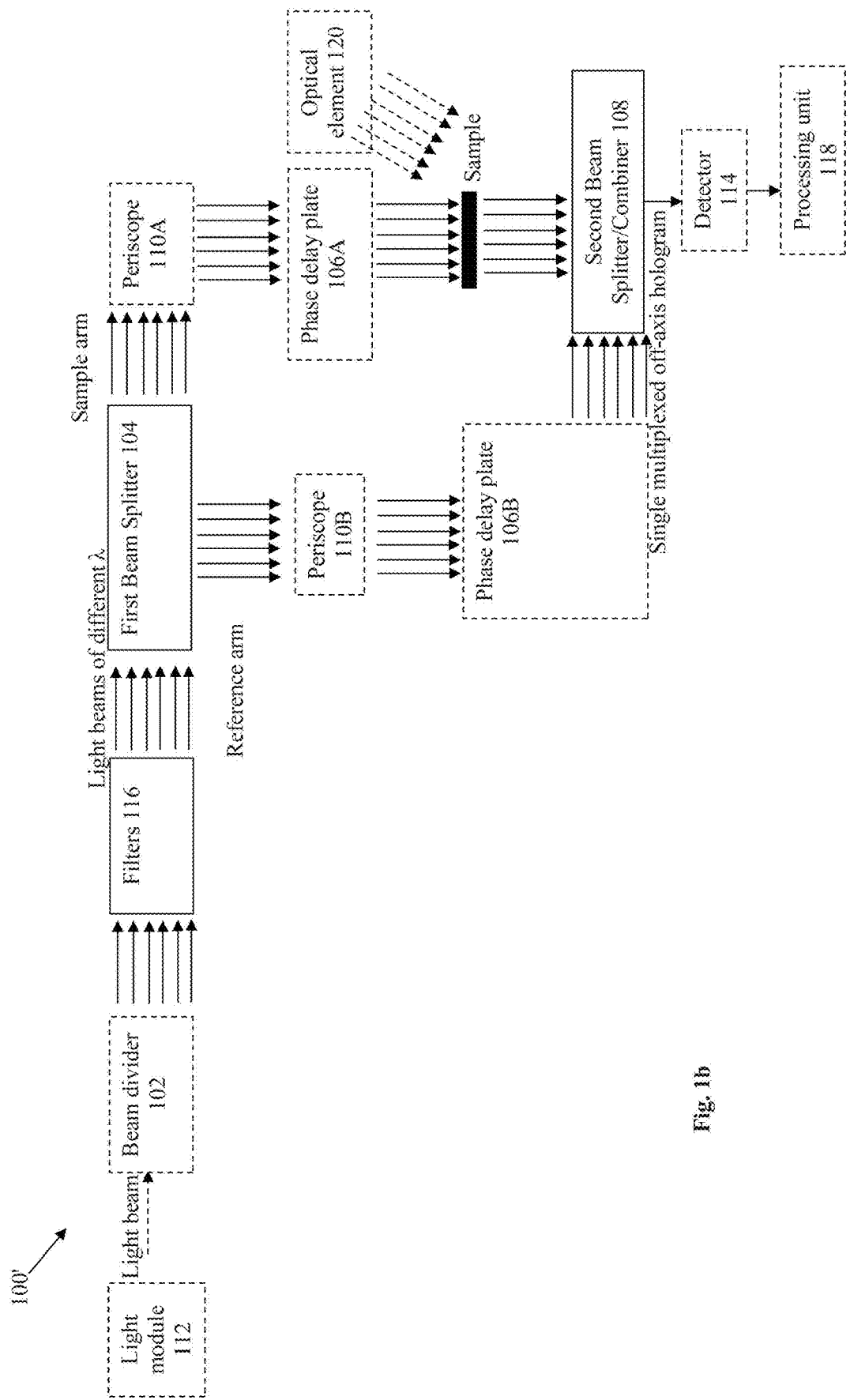

Reference is made to FIG. 1b illustrating by way of a block diagram the main functional elements of the off-axis interferometric system of some embodiments of the presently disclosed subject matter. The off-axis interferometric system 100' of some embodiments of the presently disclosed subject matter includes a first beam splitter 104 being configured and operable for receiving at least one beam composed of at least six wavelengths and dividing a common optical path into a sample arm and reference arm; the at least six different wavelengths are configured for illuminating a sample; at least six filters 116, each filter being configured to allow propagation of one of the wavelengths for each of the at least six reference or sample beams; a second beam splitter/combiner 108 being configured and operable for receiving the at least six reference beams and the at least six sample beams scattered by the sample and combining them accordingly. Off-axis interferometric system 100' is thus configured and operable to compress at least six parallel complex wavefronts into a single multiplexed off-axis hologram containing linear off-axis fringes of at least six different orientations. Off-axis interferometric system 100' may include a light module 112 generating the at least partially coherent light beams of six different wavelengths. In this connection, it should be understood that to multiplex six interferograms with the same illumination wavelength as described in FIG. 1a, the light should or can be only partially coherent, as coherence gating is not possible with highly coherent light of a single wavelength. However, if six different wavelengths are used as described in this embodiment, coherence gating may not be necessary i.e. the phase delay plates are then optional, and the light does not need to be only partially coherent (periscopes 110A and 110B are then also optional if the lasers used are highly coherent). To produce six different wavelengths, the light module 112 may include a single light source which may be used together with a beam divider 102 (integrated within light module 112 or not) allowing propagation of a certain number of wavelengths. Beam divider 102 may be configured and operable for receiving an at least partially coherent light beam and generating at least six beams of different wavelengths along the common optical path. Alternatively, light module 112 may include a plurality of light sources used in parallel. Similarly to the embodiment described in FIG. 1a, off-axis interferometric system 100' may also optionally include a first and second periscope 110A and 110B and/or an arrangement of lenses (not shown) and/or a detector 114.

As will be described in detail further below with respect to the embodiment described in FIG. 4, in some embodiments, off-axis interferometric system 100' includes an optical element 120 which is configured for illuminating the sample from at least six different illumination angles other than normal incidence. The number of illumination angles may be unlimited. For example, if two detectors are used, one at each exit of the interferometer, the sample may be illuminated at 8 or 12 illumination angles. Even without using two cameras, the number of beam pairs (and illumination angles) that can be multiplexed is limited only or mostly by the connection between cross-correlation term diameter and image resolution and magnification. The higher the magnification, or the lower the resolution, the smaller the cross-correlation term becomes, allowing the system to multiplex more holograms. Off-axis interferometric system 100' may also include a processing unit 118 being connected to detector 114 and is configured and operable to receive data indicative of the at least six combined complex wavefronts beams, and to process the data to reconstruct each of the at least six parallel complex wavefronts encoded. Optical element 120 may be a separate external element or may be integrated within the sample arm. As described above, beam divider 102 splits the beam into a plurality of beams that are then split by beam splitter 104 into both arms. The plurality of beams passes through phase delay plate 106A and then illuminate the sample from different angles. Beam divider 102 and optical element 120 may together operate to split the beams and to direct the beams toward the sample, so that the beams illuminate the sample from multiple angles.

Figure 2A:
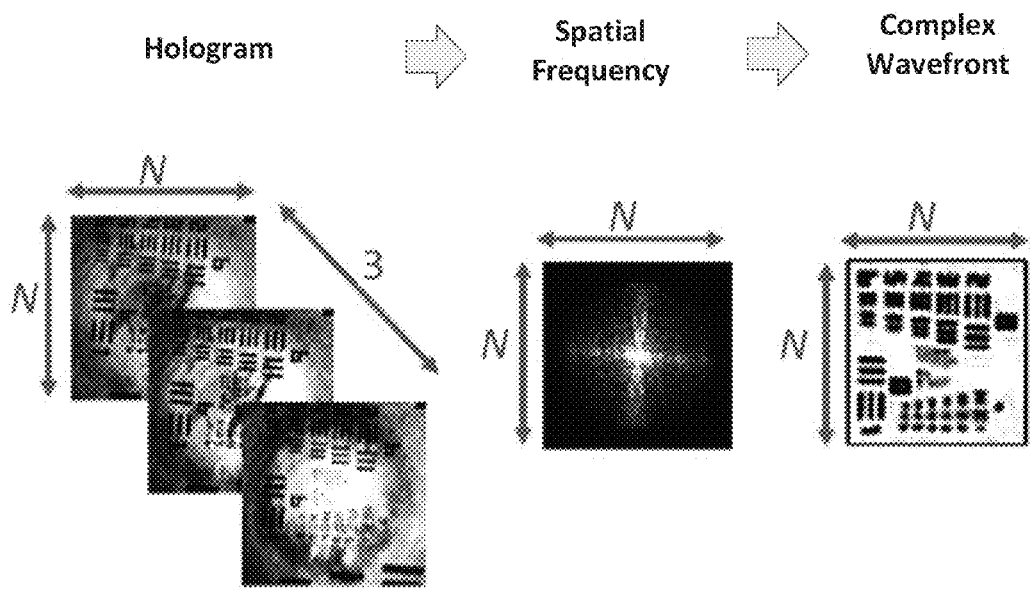
FIGS. 2a-2c show a comparison of on-axis holography (FIG. 2a), standard off-axis holography (FIG. 2b), and six-pack hologram (FIG. 2c)
Figure 2B:
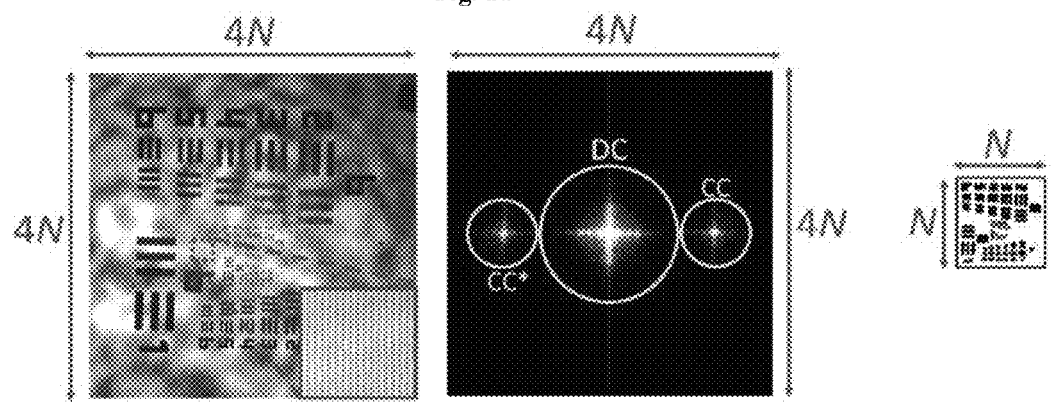
Figure 2C:
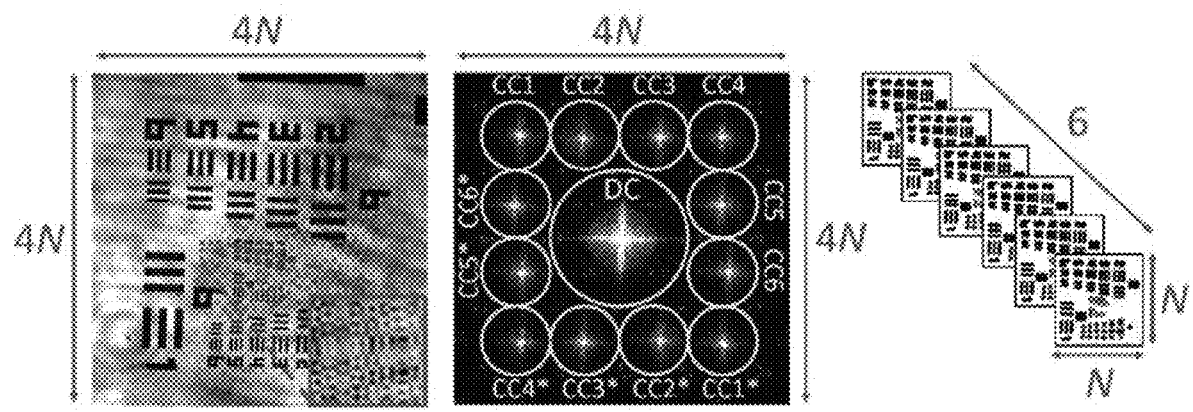

Until now, it has been well known that a single off-axis hologram requires four times more pixels than a single on-axis hologram, whereas on-axis holography requires the acquisition of three phase-shifted holograms in order to reconstruct the complex wavefront. Reference is made to FIGS. 2a-2c comparing between different holograms. As shown in FIG. 2a, assuming that a single on-axis hologram requires $N \times N = N^2$ pixels, then one needs $3N^2$ pixels in order to reconstruct the complex wavefront of the sample using on-axis holography. FIG. 2a shows that when using on-axis holography, three $N \times N$ on-axis holograms are required to reconstruct a single $N \times N$ complex wavefront (on-axis: $3N^2 \rightarrow N^2 = 18N^2 \rightarrow 6N^2$). Standard off-axis holography, on the other hand, would require $4N \times 4N = 16N^2$ pixels to acquire the same wavefront, as shown in FIG. 2b, but would only or likely need a single exposure, making it more suitable for dynamic samples, but consuming more of the camera spatial bandwidth. FIG. 2b shows that when using typical off-axis holography, a single $4N \times 4N$ off-axis hologram is required to reconstruct a single $N \times N$ complex wavefront (off-axis: $16N^2 \rightarrow N^2$). The off-axis interferometric system of some embodiments of the presently disclosed subject matter compresses six complex wavefronts into the same number of camera pixels. Thus, as shown in FIG. 2c, when the system of some embodiments of the presently disclosed subject matter is used, $16N^2$ pixels, the same number of pixels used for a single off-axis hologram, are sufficient to acquire six complex wavefronts, whereas in the case of on-axis holography, $3N^2 \times 6 = 18N^2$ pixels are needed to acquire the same six complex wavefronts. FIG. 2c shows that when using the off-axis interferometric system of some embodiments of the presently disclosed subject matter, a single $4N \times 4N$ off-axis multiplexed hologram is required to reconstruct six $N \times N$ complex wavefronts ($16N^2 \rightarrow 6N^2$). Thus, the off-axis interferometric system of some embodiments of the presently disclosed subject matter is 12.5% more spatial bandwidth efficient than on-axis holography, and at least 50% more bandwidth efficient than other off-axis holography multiplexing methods. The insets in FIG. 2b and FIG. 2c show the corresponding fringes magnified ten times. In the figures, CC refers to a cross-correlation term, CC* to a complex conjugate of corresponding CC term, and DC to an auto-correlation term. In this connection, it should be noted that although the above examples describe multiplexing of six complex wavefronts, the invention is not limited to the use of six interferometric channels. Using the same principles, a larger number of interferometric channels can be created, providing a larger number of cross-correlation terms, while reducing the spatial frequency bandwidth of each term to prevent overlap in the spatial frequency domain. While this would likely result in decreased resolutions or fields of view, for some applications the multiplexing of a large number of complex wavefronts may be required.

It should be noted that the technique of some embodiments of the presently disclosed subject matter assumes the general case in which the sample is not sparse in any spatial dimension, as opposed to other works that allow a larger number of multiplexed channels for sparse samples. In this case, the off-axis interferometric system represents the optimal compression ratio for experimentally acquired holograms. Furthermore, the off-axis interferometric system does not have pixel registration problems, as would be the case when acquiring three parallel channels of on-axis holography for capturing fast dynamics.

Reference is made to FIGS. 3a-3b illustrating a possible configuration of the off-axis interferometric system of some embodiments of the presently disclosed subject matter. In some embodiments, off-axis interferometric system 300 is implemented as a Mach-Zehnder interferometer, including a beam divider which may be a diffractive beam splitter (DBS) receiving a beam of at least partially coherent laser light. The beam divider may be placed after the beam splitter dividing a common optical path into a sample arm and reference arm, or at any point before the sample. The divider may also be placed solely in the reference arm, or solely in the sample arm. For example, the at least partially coherent laser light may be generated by a low-coherence supercontinuum laser source (LC) and produce a certain number of collimated beams in a diverging pattern. In a specific and non-limiting example, the laser source LC may be a filtered supercontinuum laser source (NKT SuperK EXTREME), followed by an acousto-optical filter (NKT SuperK SELECT) and a laserline filter (central wavelength: 632.8 nm, full width at half maximum: 3 nm) emitting a low coherence laser light with a wavelength of 632.8 nm. It should be noted that to achieve controlled coherence length, other collimated light sources possessing a similar coherence length, such as a laser diode, can be used. However, any decrease in the coherence length decreases the area upon which interference is seen on the camera, while increasing the coherence length can lead to cross-talk between the beams, which can be solved by increasing the thickness of a phase delay plate PDP as described below. The beam splitter DBS is configured to output the desired beams. However, the DBS may also be configured to output a 2D array of beams and the unwanted beams may be blocked downstream by another element. In this specific and non-limiting example, the DBS (DigitalOptics Corporation) outputs a 2D array containing 77 collimated beams in a diverging rectangular 11×7 pattern, and the unwanted beams are subsequently blocked. The beams then traverse lens L1 (e.g. biconvex lens of 50 mm focal length) and enter beam splitter BS1 (e.g. 50:50) dividing the optical path into a sample arm and reference arm. For example, L1 may be a biconvex lens of 50 mm focal length.

Figure 3C:
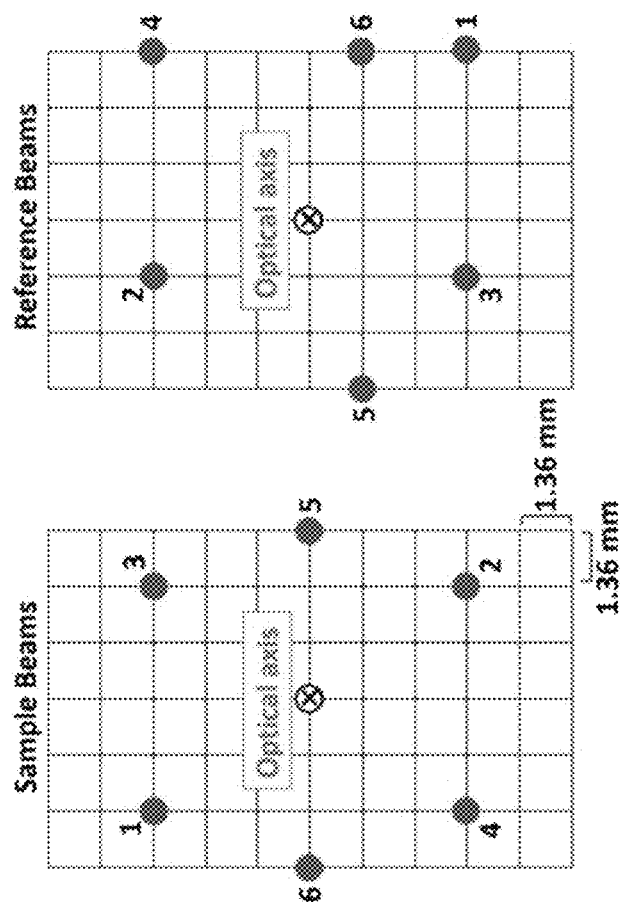
FIG. 3c illustrates a diagram of the beams used as the reference and sample beams and their positions relative to the optical axis immediately before the phase delay plates of the novel off-axis interferometric system of the presently disclosed subject matter according to some embodiments of the presently disclosed subject matter.

In the sample arm, the beams then traverse lens L2 (e.g. an achromatic lens of 50 mm focal length), periscope P1, and lens L3 (e.g. an achromatic lens of 150 mm focal length). The lenses L1 and L2 are configured to enable propagation of the beams through the beam splitter BS1 while maintaining a 4f configuration with no magnification. The beams are essentially unchanged when passing periscope P1 and then enter L3, where they are made parallel. Lenses L2 and L3 are configured such that their focal lengths define a certain ratio, to magnify the size of the pattern. In this specific and non-limiting example, the ratio of the focal lengths of L2 and L3 is three, and therefore the size of the pattern is magnified three times. This magnification creates a larger separation between the beams, increasing the angles at which the beams illuminate the sample after passing through lens L4 (e.g. a plano-convex lens of 35 mm focal length), and making it easier to block all but the six desired beams illustrated in FIG. 3c. Before passing through lens L4, the undesired beams are blocked and the remaining six beams, illustrated in FIG. 3c, pass through a phase delay plate, PDP, where each beam passes through a different number of glass sections, as illustrated in FIG. 3d.

The novel configuration of the PDP structure is another aspect of some embodiments of the presently disclosed subject matter. The PDP structures may be used as part of the off-axis interferometric system, or as a stand-alone structure. The PDP is configured for inducing a phase delay between the beams to prevent the six sample beams from interfering with each other on the detector. As illustrated in FIGS. 3d-3e, each phase delay plate 302 and 304 includes an arrangement defining a plurality of adjacent sections having a certain shape and different optical path lengths. The optical path length refers to the product of the geometric length of the section through which the light passes, and the index of refraction of the material(s). The different optical path lengths may be implemented by sections having different thicknesses (e.g. a different number of layers of a certain material) or by sections being made of materials of different refractive indices (but having the same thickness or not). The different adjacent sections are disposed in a geometrical arrangement, enabling each of at least six beams to pass through a different section. This PDP may be included of many pieces of material or be one solid piece of material. In this connection, it should be noted that, generally the term "plurality of sections" refers to different portions of the same element (being made of a single piece, or of a plurality of assembled pieces) having different optical path lengths. In a specific and non-limiting example, the PDP is composed of 2 mm thick sections of glass that are glued together at the edges in order to prevent the glue from increasing the phase delays. This specific PDP induces a minimum optical path delay of 1.16 mm between the beams, which, as the coherence length of the laser is 42.4 µm, prevents the six sample beams from interfering with each other. A similar PDP is used in the reference arm, thus solving the problem of undesired interference between the numerous sample and reference beams of the six channels. The six delayed sample beams then pass through L4 and illuminate the sample at six different angles. In this specific and non-limiting example, beams 1 to 4 illuminate the sample S at an angle of 7.96° from the optical axis, and beams 5 and 6 illuminate the sample S at an angle of 6.64° from the optical axis. In this example, by illuminating the sample at the described angles, beams 1 to 4 downshift the sample frequencies by a factor of 55.0% of the NA of the microscope objective MO (Leica 439, 10× magnification, 0.25 NA, infinity corrected), and beams 5 and 6 downshift the sample frequencies by a factor of 45.8% of the numerical aperture of the microscope objective.

In some embodiments, the off-axis interferometric system of the presently disclosed subject matter includes a detector. The detector may be configured for both amplitude and phase imaging. For example, the camera may be a simple 8-bit digital camera (e.g. DCC1545M, Thorlabs monochromatic CMOS, 1280×1024 square pixels of 5.2 µm each). In this specific and non-limiting example, the light scattered by the sample is then collected and imaged on a detector (e.g. digital camera C) by microscope objective MO and lens L5 (e.g. achromatic tube lens of 300 mm focal length), passing through beam splitter BS2 (e.g. 50:50), where the sample beams are combined with their reference pairs. In this specific and non-limiting example, the final image magnification is 16.33, and the diffraction limited spot size is 2.53 µm.

In the reference arm, nearly the same optical path is experienced by the reference beams. One of the significant differences are that six different beams are blocked, as in FIG. 3c, and a correspondingly different PDP is used, as in FIG. 3e. These changes, as well as different focal lengths for L8 to L10 compared to L4 and L5, are in order to produce the correct off-axis angles on the detector required for six-pack holography. More specifically, in the reference arm, the beams pass through lens L6, periscope P2, and lens L7, which are identical to L2, P1, and L3, respectively. In this specific and non-limiting example, periscopes P1 and P2 are each composed of (1) two stationary mirrors placed along the optical axis and having an angle of 270° between their reflective faces, and (2) a retroreflector composed of two mirrors with an angle of 90° placed between their reflective faces. The retroreflector in P2 is mounted on a translation stage that can be used to carefully adjust the distance between the retroreflector and the two stationary mirrors. This enables adjustment of the optical path length of the reference arm in order to compensate for the delay induced by the sample. After passing through L7, all but the requisite six beams are blocked, as illustrated in FIG. 3c, and the beams pass through a PDP (shown in FIG. 3e), which is similar to the plate in the sample arm but with the glass segments arranged differently in order to correspond to the different beam pattern shown in FIG. 3c. The pattern of the six reference beams differs from the pattern of the sample beams as it is configured to generate off-axis angles suitable for multiplexing six holograms, and the PDP of the reference arm is configured to match the phase delays between the six matching sample and reference beam pairs. The reference beams then pass through L8 (e.g. achromatic lenses of 75 mm focal length), L9 (e.g. achromatic lenses of 100 mm focal length), and L10 (e.g. achromatic lenses of 150 mm focal length), with reference beams 1, 2, 3, and 4 illuminating the camera C at a certain off-axis angle (e.g. 2.45°), and beams 5 and 6 illuminating the camera at a different off-axis angle (e.g. 2.32°).

While all or most lenses in the sample arm, including L1 and L2, are arranged in a 4f configuration, the distances between L8 and L9, as well as L10 and the camera C, are not 4f (e.g. 155 mm and 200 mm, respectively). This is necessary in order to create high off-axis angles while having all six reference beams illuminate the same point on the camera. The specific geometry utilized to generate these off-axis angles leads to an estimated 33% decrease in reference beam diameter. To compensate for the corresponding increase in intensity, a neutral density filter, ND, (e.g. of optical density 1.5), may be placed after lens L8. After constructing the system, an image of a USAF target obtained by using the novel off-axis interferometric system was captured and used to determine CC term positioning in the SA. Initial rough alignment was done by positioning the six CC terms based on the known power spectrum pattern (cross shape) produced by the USAF. Fine tuning of the alignment was achieved empirically by individually shifting the locations of opposing pairs of CC terms, in 1 pixel increments, then adding the two terms together to create a 2-term SA while taking the average value of overlapping pixels, and then examining the resulting amplitude image, and comparing it to the known USAF design. After this process, stitching of the SA was done by using solely the frequencies of the CC term with the highest maximum power, where two or more CC terms overlap. In this specific and non-limiting configuration, off-axis interferometric system 300 also includes two mirrors (M1, M2) configured for redirecting the sample and reference beams so that they can meet at beam splitter BS2 and be combined. For sake of illustration, the red line displays the optical axis and not the six sample and six reference beam paths.

FIG. 3b illustrates two of the six beams illuminating the sample at opposing angles from the optical axis in the sample arm of the interferometer. As shown in this figure, the beams in this pattern alternate between diverging and being parallel to each other as they pass through the lenses. The region marked 'Periscope' is the location of periscope P1 in FIG. 3a.

FIG. 3c illustrates a diagram of the beams used as the reference and sample beams and their positions relative to the optical axis immediately before the phase delay plates. Each vertex in the image corresponds to one of the beams produced by the DBS in both arms. In this embodiment, only the numbered beams (red circles) are not blocked. FIG. 3d and FIG. 3e illustrate possible sample and reference PDP structures.

As the off-axis interferometric system projects at least six holographic channels on the camera simultaneously, it may require cameras with higher grayscale dynamic range, depending on the absorbance properties of the sample.

Figure 4:
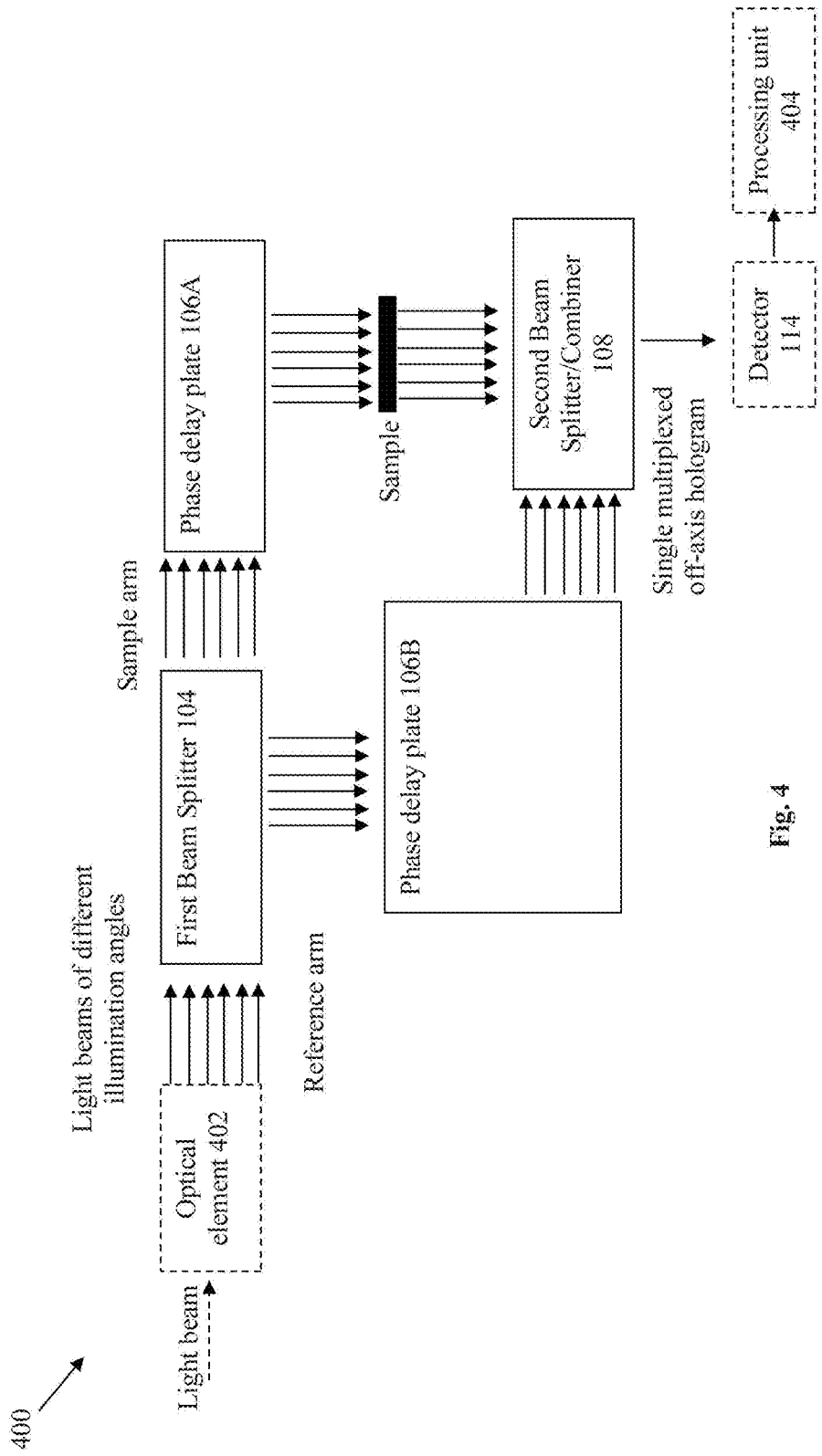
FIG. 4 is a simplified block diagram of one possible embodiment of the novel off-axis interferometric system of the presently disclosed subject matter.

Reference is made to FIG. 4 illustrating, by way of a block diagram, one possible embodiment of the off-axis interferometric system of of the presently disclosed subject matter. The off-axis interferometric system 200 of some embodiments of the presently disclosed subject matter includes a first beam splitter 104 configured and operable for receiving the at least six beams and dividing the common optical path into a sample arm and reference arm; first and second phase delay plates 106A and 106B are placed in the optical path of the sample and reference arms respectively, the first and second phase delay plates 106A and 106B being configured and operable to induce a phase delay between the at least six beams to encode each of the at least six beams using a different fringe orientation, and preventing the at least six beams from interfering with each other, thereby creating at least six parallel interference channels having different interference orientations on a detector; wherein the first and the second phase delay plates 106A and 106B are configured for inducing a different phase delay between the at least six beams of the reference and sample arms; the first phase delay plate 106A is placed upstream of a sample being illuminated by at least six delayed sample beams respectively; and a second beam splitter/combiner 108 is placed downstream of the second phase delay plate 106B and is configured and operable for receiving the at least six reference beams and the at least six sample beams scattered by the sample, and combining them accordingly.

Although not explicitly shown, this embodiment can be included in the configurations described in FIGS. 1a-1b. In this embodiment, off-axis interferometric system 400 includes an optical element 402 (e.g. converging lens or an arrangement of mirrors) being configured for illuminating the sample from up to six different illumination angles other than normal incidence, such that each of the at least six optically compressed off-axis holograms encodes a different spatial frequency range of the imaged sample. Off-axis interferometric system 400 may also include a processing unit 404 being connected to detector 414 and being configured and operable to receive data indicative of the at least six combined complex wavefronts, and to process the data to reconstruct each of the at least six parallel complex wavefronts encoded. Once the six-pack hologram is captured in a single camera exposure by detector 114, the processing unit 404 may perform a single digital 2D Fourier transform and crop the at least six cross-correlation (CC) terms corresponding to the at least six complex wavefronts from the six illumination angles. The processing unit 404 may then construct the synthetic aperture SA by positioning the CC terms according to the relative downshift of the frequencies they contained and the direction of illumination. Processing unit 404 is thus in data communication with detector 114.

In general, processing unit 404 may be a processor, a controller, a microcontroller, or any kind of integrated circuit. Processing unit 404 is configured generally as a computing/electronic utility including inter alia such utilities as data input and output modules/utilities, memory (i.e. non-volatile computer readable medium), and analyzer/data processing utility. The utilities of the processing unit 404 may thus be implemented by suitable circuitry and/or by software and/or hardware components including computer readable code configured for receiving data indicative of the at least six combined beams and for processing the data to reconstruct each of the at least six parallel complex wavefronts encoded. The features of some embodiments of the presently disclosed subject matter may include a general-purpose or special-purpose computer system including various computer hardware components. Features within the scope of some embodiments of the presently disclosed subject matter also include computer-readable media for carrying out or having computer-executable instructions, computer-readable instructions, or data structures stored thereon. Such computer-readable media may be any available media, which are accessible by a general-purpose or special-purpose computer system. In this description and in the following claims, a "processing unit" is defined as one or more software modules, one or more hardware modules, or combinations thereof, which work together to perform operations on electronic data. The physical layout of the modules is not relevant. Off-axis interferometric system 400 may also be used for single-shot phase tomography (PT) for producing a 3D refractive index map of a sample. Processing unit 404 is configured and operable to generate a 3D refractive index map of a sample. A single off-axis interferogram can be used to produce a 2D phase map image of the sample, and by multiplying the unwrapped phase map by the illumination wavelength and dividing by $2\pi$, an optical path delay map can be produced, where the OPD value at each spatial point (x,y) is described by Eq. 1 below, where T is the actual physical thickness of the sample in meters, $n_s$ is the integral refractive index of the sample across the sample thickness, and $n_m$ is the refractive index of the surrounding medium, resulting in OPD being measured in meters.

$$OPD(x,y) = T(x,y) \times \{n_s(x,y) - n_m\} \quad (1)$$

By acquiring multiple OPD maps from various illumination angles, a 3D model of the sample's refractive index distribution can be produced, in a manner that is nearly identical to the 3D density maps produced from x-ray images in computerized tomography (CT) scans.

The process of producing the 3D model is usually performed using either the Fourier slice algorithm or optical diffraction tomography (ODT) algorithm. The Fourier slice algorithm treats diffraction as negligible and assumes that all light passes straight through the sample, while the ODT algorithm does not make these assumptions and includes diffractive effects. As such, the ODT algorithm is more accurate, yet more computationally heavy. In a sample that has only or mostly a small range of refractive index values, such as biological cells, the Fourier slice algorithm is a good and easy to run approximation.

The off-axis interferometric system of some embodiments of the presently disclosed subject matter can be used with a sample being illuminated from at least six angles, and, using an algorithm such as the ODT algorithm, a 3D refractive index map can be generated from a single multiplexed hologram. This enables acquisition of a truly dynamic 3D refractive model of a sample.

As mentioned above, the off-axis interferometric system of some embodiments of the presently disclosed subject matter may be used for multicolor holographic imaging. In this embodiment, at least six filters or more can be placed in either sample or reference arm. If the sample is illuminated with zero order beam, the filters should be in the reference arm. Therefore, by illuminating the beam divider and blocking all but the zero-order sample beam composed of at least six different wavelengths, it is possible to multiplex six or more holograms of different wavelengths. Alternatively, placing the beam divider solely in the reference arm also enables to multiplex six or more holograms of different wavelengths. Aside from using only the zero-order sample beam, in the reference arm the six or more beams must or should be filtered to allow only (in this embodiment) one of the wavelengths to pass for each beam. In this configuration, a phase delay plate is optional, since different wavelengths do not interfere, and thus crosstalk does not occur. This configuration enables fast spectroscopic analysis of samples, as well as synthetic wavelength interferometry. This is a specific case where the beam divider is a 2D diffraction grating, computer generated hologram, or diffractive beam splitter. In such a case, if the divider is illuminated with multicolor light, all but the on-axis zero order beam will show dispersion between the colors, so in cases where all six wavelengths are desired to illuminate the sample at normal incidence, all but the zero order beam (or on-axis beam) are blocked.

In some embodiments, off-axis interferometric system 400 may further include at least six filters, wherein the first beam splitter is configured and operable for receiving at least one beam composed of at least six wavelengths; the at least six different wavelengths are configured for illuminating a sample, and the second beam splitter/combiner is configured and operable for receiving the at least six reference beams and the at least six sample beams scattered by the sample and combining them accordingly, each filter being configured to allow propagation of one of the wavelengths for each of the at least six reference or sample beams.

The off-axis interferometric system of some embodiments of the presently disclosed subject matter may be used for increasing the unambiguous range of phase maps. In this connection, it should be understood that, in a standard hologram, the phase of the wavefront is wrapped between $-\pi$ to $\pi$ radians. Normally, an unwrapping algorithm is implemented to determine where there are $2\pi$ jumps in phase and correct these jumps, producing the unwrapped phase map that is needed in order to generate an OPD map. However, when the increase in phase between two neighboring points is greater than $2\pi$ (i.e. the OPD is greater than one wavelength), it may be impossible to determine the exact phase using unwrapping algorithms.

Synthetic wavelength interferometry solves this ambiguous range problem by illuminating the sample with two or more wavelengths. Each wavelength produces different phase maps with phase jumps in different locations, and these phase maps can be compared in order to solve the phase ambiguities. The resulting phase map is equivalent to the phase map that would have been created by a larger wavelength, the synthetic wavelength $\Lambda_{12}$ defined in Eq. 2 below, where $\lambda_1$ is the first illumination wavelength and $\lambda_2$ is the second illumination wavelength.

$$\Lambda_{12} = \frac{\lambda_1 \lambda_2}{|\lambda_1 - \lambda_2|} \quad (2)$$

While the resulting phase map will also possess increased phase noise, this noise can be reduced to the normal level by comparing this synthetic phase map to one of the original phase maps. It is possible to extend this technique by illuminating with more than two wavelengths, and then applying hierarchical phase unwrapping to the multiple phase maps in order to produce a more accurate final phase map. Utilizing the off-axis interferometric system of some embodiments of the presently disclosed subject matter by illuminating with six or more wavelengths allows for smaller steps in the hierarchical phase unwrapping, making the resulting phase map less noisy. The six or more wavelengths may be used to generate synthetic wavelengths, increasing the unambiguous range of a phase map.

In some embodiments, the configuration of the novel off-axis interferometric system of the presently disclosed subject matter may be used for increasing resolution in dynamic holographic imaging using a simultaneous synthetic aperture (SA) super-resolution approach. To this end, processing unit 404 may be configured and operable to generate a super-resolved image, creating an increased synthetic numerical aperture (NA). In SA super-resolution, the sample is illuminated from various angles other than normal incidence, resulting in downshifting the sample spatial frequencies, and enabling the acquisition of higher frequencies that would not normally enter the aperture of the microscope objective. The spatial frequencies of the acquired images can then be stitched together to create a wider SA containing the higher frequencies that were previously lacking in an image of normal-incidence illumination. Performing an inverse Fourier transform then produces a super-resolved image, which emulates an increased effective numerical aperture (NA). This SA imaging approach can be combined with digital holography for complex wavefront acquisition with increased resolution.

Figure 5A:
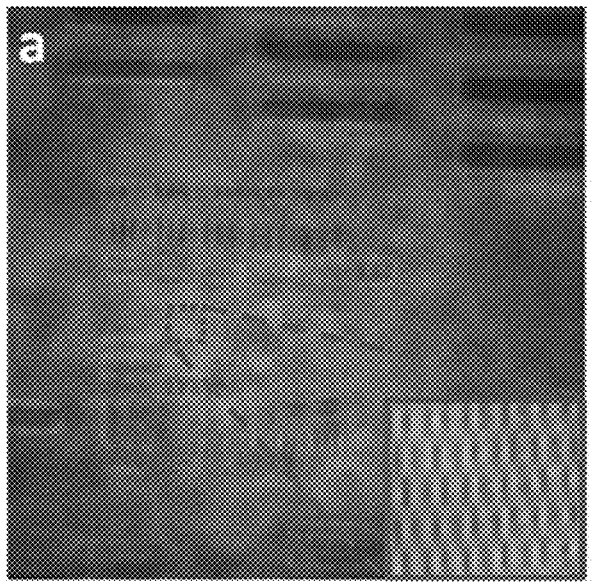
FIG. 5a illustrates a six-pack multiplexed hologram of a USAF target, experimentally acquired in a single camera exposure by using the off-axis interferometric system of some embodiments of the presently disclosed subject matter.
Figure 5B:
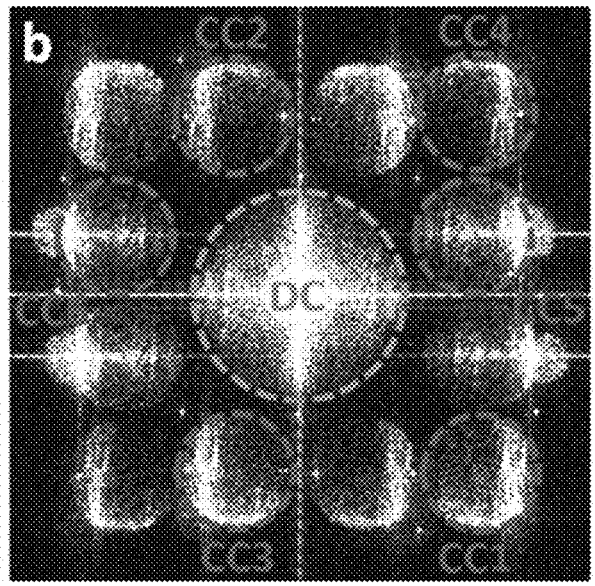
FIG. 5b illustrates the corresponding spatial frequency power spectrum.
Figure 5C:
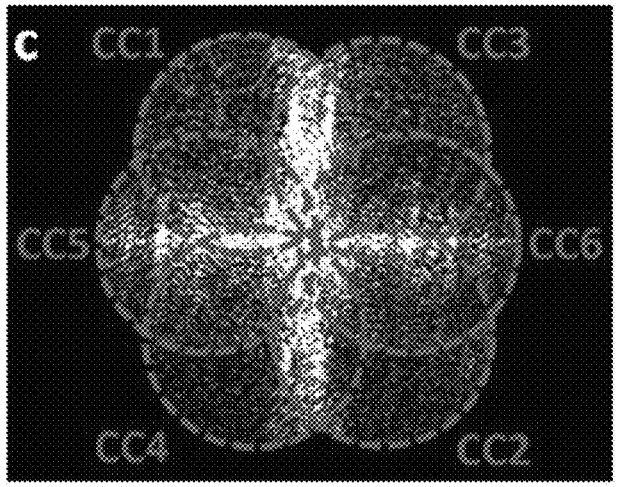
FIG. 5c illustrates positioning of cross correlation terms in the synthetic aperture.
Figure 5D:
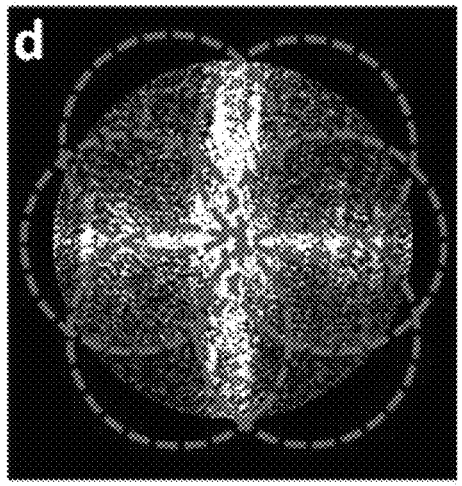
FIG. 5d illustrates the same synthetic aperture as in FIG. 5c after cropping to the largest possible circle.
Figure 5E:
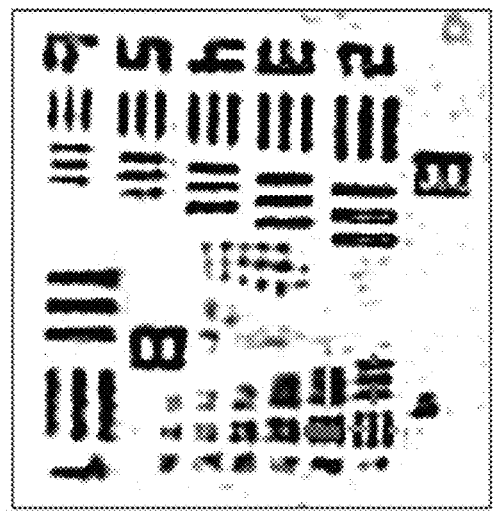
FIG. 5e illustrates an amplitude image produced from FIG. 5d.
Figure 5F:
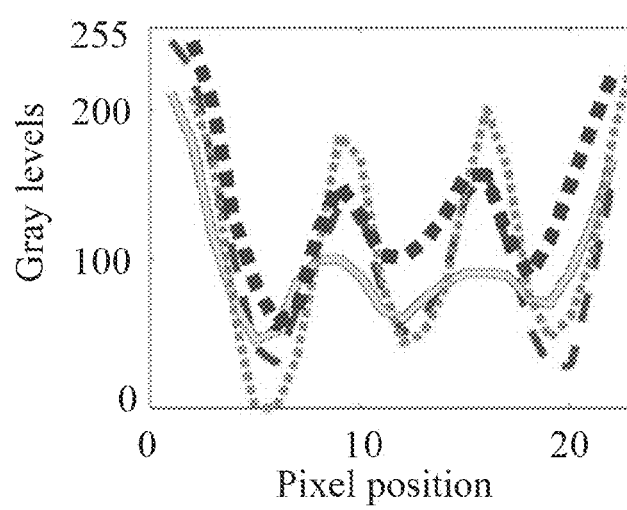
FIG. 5f illustrates profiles along the lines marked in FIG. 5e demonstrating the smallest resolvable elements.

The multiple images created by illuminating the sample from different angles, which are needed to produce a SA image, can simply be acquired sequentially at different times, or simultaneously in a single camera exposure by using spatial multiplexing. When combined with multiplexed off-axis holography, each of the SA perspective images can be encoded into off-axis holograms of different fringe orientations, and all off-axis holograms can be acquired in a single exposure. Reference is made to FIGS. 5a-5f illustrating a specific and non-limiting example of a possible use of the off-axis interferometric system of some embodiments of the presently disclosed subject matter. In some embodiments, the off-axis interferometric system of the presently disclosed subject matter may be configured for SA super-resolution imaging. In this specific and non-limiting example, a positive 1951 USAF target having 11 groups, each with 6 elements, was imaged by the off-axis interferometric system, and a SA was created using the process detailed above. To compensate for beam curvatures, a hologram without the USAF target present (a background image) was also captured, and a background SA was created using the same process. The inverse Fourier transform of the USAF SA was pixel-wise divided by the inverse Fourier transform of the background SA, and the absolute value was taken, thereby generating an amplitude image of the USAF target. The six-pack multiplexed hologram of the USAF target experimentally acquired in a single camera exposure and its corresponding spatial frequency power spectrum (i.e. 2D Fourier transform) are shown in FIG. 5a and FIG. 5b, respectively. The inset of FIG. 5a shows fringes magnified five times. The SA was created by cropping the six CC terms, repositioning them, and then cropping to the largest possible centered circle with no missing frequencies. The CC term positioning when creating the SA, and the final cropped SA to the largest possible circle, are shown in FIG. 5c and FIG. 5d. CC numbering corresponds to matching sample beam from FIG. 3c. The reconstructed amplitude image obtained from FIG. 5d after performing an inverse Fourier transform is shown in FIG. 5e. FIG. 5f shows profiles along the lines marked in FIG. 5e demonstrating the smallest resolvable elements.

Figure 6A:
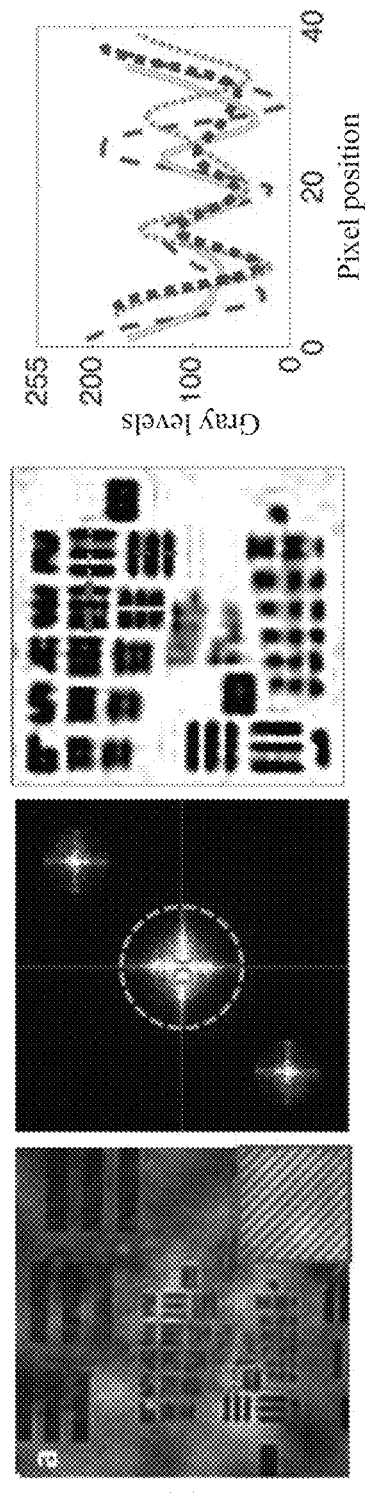
FIGS. 6a-6c show a comparison of standard off-axis holography (FIG. 6a), a two-pack hologram (2PH) (FIG. 6b) and a four-pack hologram (4PH) (FIG. 6c)

For comparison, the same test target was imaged by the off-axis interferometric system using a normal-incidence illumination beam and a single reference beam to provide a standard off-axis hologram (1PH). These results are shown in FIG. 6a. The visibilities of the USAF elements from the standard off-axis holography amplitude image were calculated based on the profiles in FIG. 6a. The vertical visibility of element 2 from group 8 was found to be 67%, while the horizontal visibility of the same element was calculated to be 70%. The same calculations were done for the vertical and horizontal profiles of element 3 from group 8 and the visibilities were found to be 30% and 42%, respectively. Thus, the corresponding resolution limit of the standard amplitude image is between 1.55-1.74 µm.

Following this, the visibilities of the USAF elements from the six-pack SA amplitude image were calculated based on the profiles in FIG. 5f. The vertical visibility of element 1 from group 9 was found to be 61%, while the horizontal visibility of the same element was calculated to be 73%. The same calculations for the vertical and horizontal profiles of element 2 from group 9 determined that the visibilities were 24% and 30%, respectively. Thus element 1, possessing a line width of 0.98 µm, is the resolution cutoff for the six-pack SA.

Based on these results, the approximate increase in resolution is between 1.58-1.78 times the original resolution, corresponding to NAs of 0.395-0.445. This closely matches the expected increase in resolution which, based on the relative size and positions of the CC terms when constructing the SA, and after cropping the SA to a circle with no missing frequencies as illustrated in FIG. 5d, was calculated to be 1.62 times.

Figure 6B:
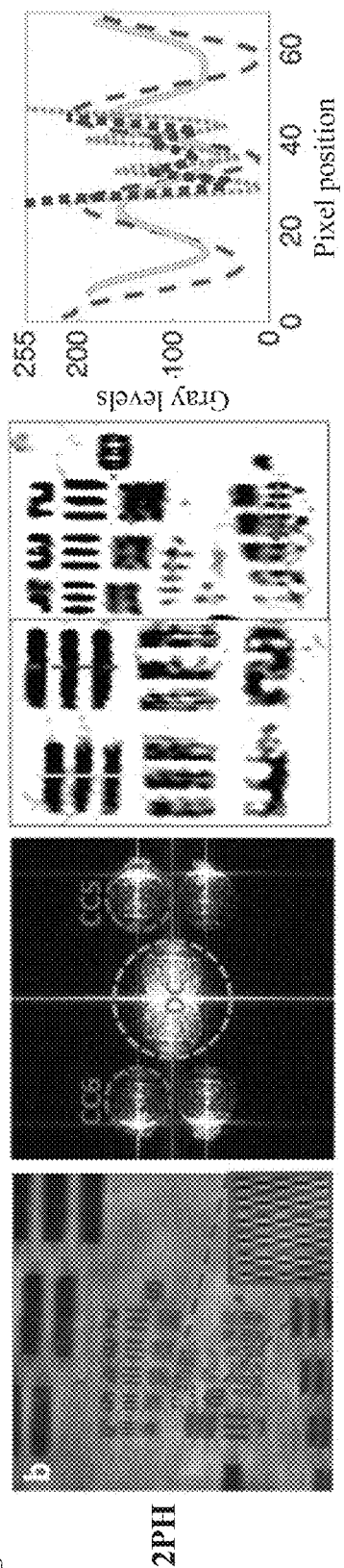
Figure 6C:
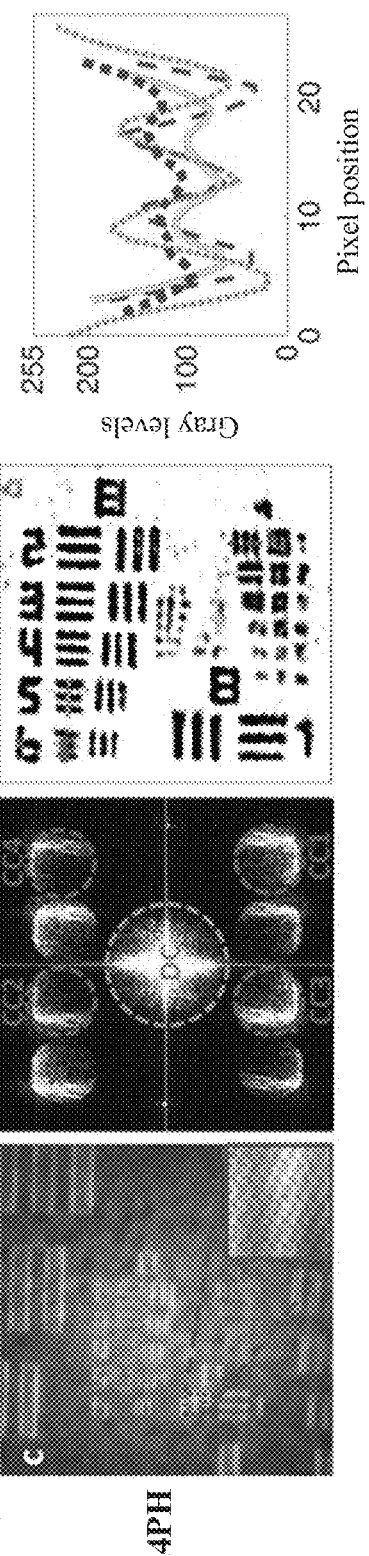

For comparison, two-pack holography (2PH) and four-pack holography (4PH) were also implemented by selecting solely the frequencies covered by two terms, CC5 and CC6 from FIG. 5c, and four terms, CC1-CC4 from FIG. 5c, respectively. The results and corresponding profiles are shown in FIG. 6b and FIG. 6c, and the resolution limits for all amplitude images, including those of the six-pack SA and standard off-axis images, are shown in FIG. 7. For the 2PH amplitude image, the left side of FIG. 6b shows elements from group 7. All other amplitude images show elements from groups 8 and 9. In FIG. 6b, it can be seen that the two CC term (2PH) amplitude images can resolve up to element 1 of group 9 in the horizontal direction, but can resolve only (in this embodiment) up to element 2 of group 7 in the vertical direction due to CC5 and CC6 having a very limited coverage of vertical frequencies. A similar limitation is seen in FIG. 6c where the four CC term (4PH) amplitude image can resolve up to element 1 of group 9 in the vertical direction, but only (in this embodiment) up to element 5 of group 8 in the horizontal direction due to the limited horizontal frequency coverage of CC1-CC4. From the left to right column in FIGS. 6a-6c, the four figures show respectively: a hologram with inset showing fringes magnified five times, corresponding spatial frequency power spectrum, reconstructed amplitude image, and profiles at the locations marked on the amplitude image. By combining all six CC terms, the highest possible resolutions in all or most directions can be achieved. For comparison, the results of the off-axis interferometric system of some embodiments of the presently disclosed subject matter are shown in FIGS. 5a-5f. As described above, FIG. 7 shows for each group the resolution limits for all amplitude images: the first bar from the left is the vertical resolution, and the second bar is the horizontal resolution.

The off-axis interferometric system of some embodiments of the presently disclosed subject matter configuration for super-resolution enables the creation of a larger SA from dynamic acquisition, as the six channels are acquired in a single exposure. It should also be noted that as the six channels share the same dynamic range of the grayscale level of the camera, the signal to noise ratio (SNR) of a standard hologram reconstruction in comparison to six-channel SA reconstruction was experimentally quantified. This was done by calculating the mean value and standard deviation for the same rectangular region of the image in which no sample was present. The approximate SNR values were then defined as the mean value divided by the standard deviation. The SNR for the standard image was 19.2 while the SNR for the SA image of the off-axis interferometric system was 13.3. This indicates that the SNR has decreased by 41%. In order to compare the effect of shot noise on the SNR of each channel, Eq. 8 from [7] was used, which predicted a decrease of at least 59% when comparing one channel to six channels. The SA SNR was better than expected, due to the fact that six different images were not simply multiplexed, but rather six different frequency bands of the same image. In the technique of some embodiments of the presently disclosed subject matter, most of the captured frequencies were used to construct the SA. This is roughly equivalent to capturing a single standard off-axis hologram while using an objective with a higher NA, and thus the SNR of the SA of the off-axis interferometric system is closer to that of a higher NA standard hologram than would normally be expected.

It should be noted that, once the six-pack hologram is captured and the SA is constructed, numerical refocusing of the SA image is possible. When refocusing, registration of the six CC terms of the SA is maintained by introducing linear phase gradients to each CC. The direction and magnitude of each phase gradient corresponds to the illumination angle for each CC term and is multiplied by the z-distance. These phase gradients laterally translate the images generated by the CC terms and thus compensate for deregistration caused by the Fresnel propagation of CC terms from different illumination angles.

In this specific and non-limiting example, the reconstruction produced a SA that increased the resolution of the image by a factor of approximately 1.62. Further resolution increase is possible with this system, with an estimated maximum increase in resolution of 1.66 if the lens before the sample possesses a non-standard focal length of 32.5 mm. A lens of focal length smaller than 32.5 mm would downshift the sample frequencies too much and would cause some of the lowest frequencies to be missing. Moreover, to effectively decouple the correlation between illumination angle and beam diameter that is present in this system, 4f systems of microlenses are used, so that the beams would travel in parallel.

The off-axis interferometric system of some embodiments of the presently disclosed subject matter may also be used with dynamic samples. The camera captured quantitative phase videos of flowing red blood cells, as well as flowing polymer beads of 1 µm in diameter (i.e. microbeads). SAs were then produced for each video frame. The amplitude images and quantitative phase maps (i.e. reconstructed optical path delay (OPD) profiles) are shown in FIGS. 8a-8g. More specifically, in FIGS. 8a-8b, SA amplitude images of a multi-layer sample of red blood cells are extracted from a single video frame using a regular holography system (referred as 1PH in FIG. 8g) and the off-axis interferometric system (referred as 6PH in FIG. 8g), respectively. It can be seen that the resolution correspondingly increases when using the off-axis interferometric system as occurred with the images of the USAF target. FIGS. 8c-8d show OPD maps of FIGS. 8a-8b. Red arrows in FIGS. 8b and 8d indicate resolution enhancement: indentations at the centers of red blood cells are now more visible. The color bar to the left of FIG. 8c applies to FIG. 8c and FIG. 8d. The resolution enhancement in the OPD profile is more clearly seen in the 1 μm bead reconstruction shown in FIGS. 8e-8g, with FIG. 8e and FIG. 8f displaying 1PH and 6PH OPD maps of microbeads, respectively. In FIG. 8g, the cross-section graph along one of the beads in 1PH and in 6PH can be observed, demonstrating that the novel off-axis interferometric system yields an improved resolution represented by a more localized peak of the corresponding graph. As can be seen, not only does the novel off-axis interferometric system SA improve the resolution of amplitude images, it produces the same effect in the OPD maps.

Figure 9:
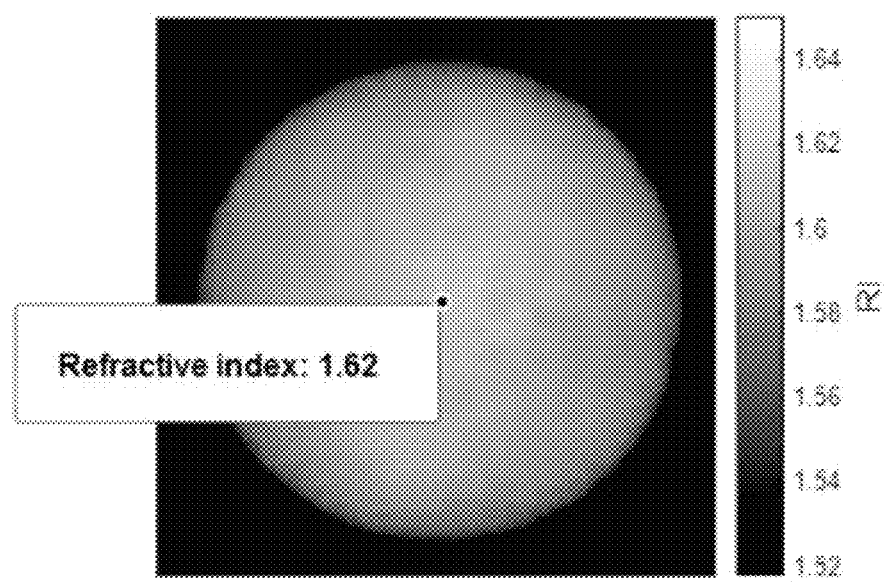
FIG. 9 shows tomography results obtained by using the off-axis interferometric system of some embodiments of the presently disclosed subject matter.

Reference is made to FIG. 9 showing results from the off-axis interferometric system of some embodiments of the presently disclosed subject matter for tomography. FIG. 9 shows a cross section of the refractive index of a 12 μm polystyrene bead immersed in oil acquired by using the off-axis interferometric system of some embodiments of the presently disclosed subject matter. Gray bar shows refractive index (RI) values. The theoretical value of the refractive index of the oil was 1.518. This result demonstrates the ability of the off-axis interferometric system to produce accurate 3D refractive index maps from a single camera exposure, making the off-axis interferometric system applicable for dynamic tomography. The refractive index values, shown in the figure, are in complete alignment with the theoretical values for polystyrene.

An off-axis interferometric system may also be used for out-of-focus light rejection. The processing unit (as illustrated for example in FIG. 1b or FIG. 4) may be configured and operable to average at least six images produced from the at least six illumination angles, thereby increasing z-resolution and out-of-focus light rejection. By illuminating the sample from six or more angles and averaging the resulting images, an image in which only or mostly objects that are in focus and visible can be produced, while others are averaged out. This is due to the fact that illuminating the sample from different angles causes out-of-focus objects to appear in different locations in the six or more images. Reference is made to FIGS. 10a-10b showing results from the off-axis interferometric system of some embodiments of the presently disclosed subject matter for out-of-focus light rejection. FIGS. 10a-10b show the optical path delay (OPD) map from a single hologram (FIG. 10a) and the refractive index (RI) map (FIG. 10a) produced by the off-axis interferometric system of the same sample. These pictures were extracted from the same video frame. In the sample, a single microalgae (*Chlamydomonas reinhardtii*) is in focus, while another microalgae swims directly above this in-focus cell. Using a simple algorithm, an RI map of the in-focus microalgae is constructed dynamically for each frame by automatically selecting the holographic channels in which the out-of-focus microalgae does not obscure the in-focus microalgae of interest. The six-digit number in the title of the RI map indicates which of the six holographic channels are used in the reconstruction of each frame, with 1 indicating a channel that is used, and 0 indicating a channel that is not used. As can be seen, the RI map of the microalgae of interest is reconstructed properly, despite this microalgae being occluded in one of the OPD images (FIG. 10a), as this image is automatically rejected by the algorithm. The videos were recorded at 50 frames per second.

Reference is made to FIGS. 10c-10d showing pictures extracted from videos showing the amplitude map from a single hologram (FIG. 10c) and the off-axis interferometric system averaged amplitude map (FIG. 10d) of the same sample. In FIGS. 10c-10d, a single stationary 12 μm polystyrene bead is in focus, while another out-of-focus bead flows above it in the water. As can be seen, the out-of-focus bead has a very strong presence in the standard hologram on the left and occludes the in-focus bead of interest, while in the off-axis interferometric system averaged amplitude map, the out-of-focus bead is nearly invisible, and the in-focus bead can be seen clearly at all times. The videos were also recorded at 50 frames per second.

The invention claimed is:
1. An off-axis interferometric system comprising:
a first beam splitter being capable of receiving at least six beams defining a common optical path and dividing the common optical path into a sample arm and reference arm;
first and second phase delay plates placed in the optical path of the sample and reference arms respectively, wherein the first phase delay plate is placed upstream of a sample and the second phase delay plate is capable of receiving at least six beams of the reference arm; wherein the first and second phase delay plates are capable of inducing (1) a phase delay between each of the at least six beams to encode each of the at least six beams with a different fringe orientation and preventing the at least six beams from interfering with each other, thereby creating at least six parallel interference channels having different interference orientations on a detector; and (2) a different phase delay between the at least six beams of the reference and sample arms; and
a second beam splitter/combiner placed downstream of the second phase delay plate and being capable of receiving at least six delayed reference beams and at least six delayed sample beams being indicative of the sample and combining them accordingly,
the presence and the position of the first and second beam splitters and of the first and second phase delay plates one with respect to the other in the optical path of the sample and reference arms respectively enables to optically multiplex at least six interferometric channels in a single camera exposure and to compress at least six parallel complex wavefronts into a single multiplexed off-axis hologram containing linear off-axis fringes of at least six different orientations.

2. The off-axis interferometric system of claim 1, further comprising at least one of:
(i) a beam divider capable of receiving an at least partially coherent light beam and generating the at least six beams along the common optical path, wherein said first beam splitter is placed downstream of the beam divider; or
(ii) first and second periscopes placed in the optical path of the sample and reference arms respectively and being capable of matching the optical paths of said plurality of beams between the sample and reference arm; or (iii) an arrangement of lenses being capable of receiving at least one of imaging beams passing therethrough, collimating the beams propagating therethrough or magnifying the size of a diverging pattern; or
(iv) a light module being capable of generating the at least partially coherent light beam; or
(v) a detector placed downstream the second beam splitter/combiner and being capable of collecting and image at least six combined complex wavefronts simultaneously in a single exposure; or
(vi) an optical element being capable of illuminating the sample from up to six different illumination angles other than normal incidence such that each of at least six optically compressed off-axis holograms encodes a different spatial frequency range of the sample; or
(vii) a processing unit being connected to a detector and being configurable to receive data indicative of the at least six combined complex wavefronts and to process the data to reconstruct each of the at least six parallel complex wavefronts encoded; or
(viii) at least six filters, wherein said first beam splitter is capable of receiving at least one beam composed of at least six wavelengths; the at least six different wavelengths being capable of illuminating a sample and said second beam splitter/combiner is capable of receiving the at least six reference beams and the at least six sample beams scattered by the sample and combining them accordingly, each filter being configured to allow propagation of one of the wavelengths for each of the at least six reference or sample beams.

3. The off-axis interferometric system of claim 2, wherein said beam divider is configured and operable for at least one of:
(a) generating a plurality of beams in a diverging pattern; or
(b) generating at least six beams of different wavelengths along the common optical path.

4. The off-axis interferometric system of claim 2, wherein said processing unit is configurable to at least one of:
(i) generate a super-resolved image, creating an increased synthetic numerical aperture (NA); or
(ii) perform a single digital 2D Fourier transform of the data, and to crop the at least six cross-correlation terms corresponding to the at least six complex wavefronts from the at least six illumination angles to construct a synthetic aperture; or
(iii) generate a 3D refractive index map of a sample; or
(iv) to average at least six images produced from the at least six illumination angles, thereby increasing z-resolution and out-of-focus light rejection; or
(v) perform a single digital 2D Fourier transform of the data, and to crop the at least six cross-correlation terms corresponding to the at least six complex wavefronts from the six wavelengths to construct a synthetic aperture; or
(vi) average at least six images produced from the at least six wavelengths, thereby increasing z-resolution and out-of-focus light rejection.

5. The off-axis interferometric system of claim 2, wherein said light module is capable of generating the at least partially coherent light beams of at least six different wavelengths.

6. The off-axis interferometric system of claim 2, wherein said first beam splitter is capable of receiving at least one beam composed of at least six wavelengths and said processing unit is configurable to receive data indicative of the at least six combined complex wavefronts of the six or more wavelengths and to process the data to generate synthetic wavelengths that increase the unambiguous range of a phase map.

7. The off-axis interferometric system of claim 1, wherein each of the first and second phase delay plates comprises an arrangement defining a plurality of sections configured such that each of the at least six beams passes through a different section, wherein each section has a different optical path length.

8. The off-axis interferometric system of claim 1, wherein the presence and the position of the first and second beam splitters and of the first and second phase delay plates one with respect to the other in the optical path of the sample and reference arms respectively enables to optically multiplex at least six fields of view in a single camera exposure and to increase the field of view of the sample by a factor of at least six.

9. A phase delay plate comprising an arrangement defining a plurality of adjacent sections having a certain shape and different optical path lengths; wherein the different adjacent sections are disposed in a geometrical arrangement enabling each of at least six beams to pass through a different section such that the phase delay plate is capable of inducing (1) a phase delay between each of the at least six beams to encode each of the at least six beams with a different fringe orientation and preventing the at least six beams from interfering with each other, thereby creating at least six parallel interference channels having different interference orientations on a detector and (2) a different phase delay between the at least six beams of the reference and sample arms.

10. A phase delay plate of claim 9, wherein the arrangement comprises multiple pieces of at least one material or is made of a single piece of material.

11. An off-axis interferometric system comprising:
an optical element being capable of illuminating the sample from up to six different illumination angles other than normal incidence, such that each of at least six optically compressed off-axis holograms encodes a different spatial frequency range of the sample;
a first beam splitter being capable of receiving at least one beam composed of at least six wavelengths and dividing a common optical path into a sample arm and reference arm;
a second beam splitter/combiner being capable of receiving the at least six reference beams and the at least six sample beams scattered by the sample and combining them accordingly,
the presence of the at least six wavelengths in the sample and reference arms respectively enables to optically multiplex at least six interferometric channels in a single camera exposure and to compress at least six parallel complex wavefronts into a single multiplexed off-axis hologram containing linear off-axis fringes of at least six different orientations such that each of the at least six optically compressed off-axis holograms encodes a different spatial frequency range of the sample.

12. The off-axis interferometric system of claim 11, further comprising at least one of:
(i) a beam divider capable of receiving an at least partially coherent light beam and generating at least six beams of different wavelengths along the common optical path; or
(ii) a first and second periscope placed in the optical path of the sample and reference arms respectively and being capable of matching the optical paths of a plurality of beams between the sample and reference arm; or (iii) an arrangement of lenses being capable of receiving at least one of imaging beams passing therethrough, collimating the beams propagating therethrough, or magnifying the size of a diverging pattern; or (iv) a light module being capable of generating the at least partially coherent light beams of at least six different wavelengths; or (v) a detector placed downstream the second beam splitter/combiner and being capable of collecting and image at least six combined complex wavefronts simultaneously in a single exposure; or (vi) a processing unit being connected to said detector and being configurable to receive data indicative of the at least six combined complex wavefronts, and to process the data to reconstruct each of the at least six parallel complex wavefronts encoded.

13. The off-axis interferometric system of claim 12, wherein said processing unit is configurable to generate at least one of:

(i) super-resolved image, creating an increased synthetic numerical aperture (NA); or (ii) perform a single digital 2D Fourier transform of the data, and to crop the at least six cross-correlation terms corresponding to the at least six complex wavefronts from the six wavelengths to construct a synthetic aperture; or (iii) generate a 3D refractive index map of a sample; or (iv) average at least six images produced from the at least six wavelengths, thereby increasing z-resolution and out-of-focus light rejection.

14. The off-axis interferometric system of claim 11, wherein the presence of the at least six wavelengths in the optical path of the sample and reference arms respectively enables to optically multiplex at least six fields of view in a single camera exposure and to increase the field of view of the sample by a factor of at least six by multiplexing the at least six fields of view.

15. The off-axis interferometric system of claim 12, wherein said first beam splitter is capable of receiving at least one beam composed of at least six wavelengths and said processing unit is configurable to receive data indicative of the at least six combined complex wavefronts of the six or more wavelengths and to process the data to generate synthetic wavelengths that increase the unambiguous range of a phase map.

* * * * *